United States Patent
Shin et al.

(10) Patent No.: US 9,497,595 B2
(45) Date of Patent: Nov. 15, 2016

(54) ELECTRONIC DEVICE AND METHOD FOR CONTROLLING THE SAME

(71) Applicant: LG ELECTRONICS INC., Seoul (KR)

(72) Inventors: Jeongeun Shin, Seoul (KR); Seungman Kim, Seoul (KR); Sungje An, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/425,574

(22) PCT Filed: Aug. 28, 2013

(86) PCT No.: PCT/KR2013/007693
§ 371 (c)(1),
(2) Date: Mar. 3, 2015

(87) PCT Pub. No.: WO2014/038809
PCT Pub. Date: Mar. 13, 2014

(65) Prior Publication Data
US 2015/0230056 A1 Aug. 13, 2015

Related U.S. Application Data

(60) Provisional application No. 61/696,307, filed on Sep. 4, 2012.

(30) Foreign Application Priority Data

Aug. 7, 2013 (KR) ........................ 10-2013-0093705

(51) Int. Cl.
*H04M 3/00* (2006.01)
*H04W 4/02* (2009.01)
(Continued)

(52) U.S. Cl.
CPC .......... *H04W 4/025* (2013.01); *G01C 21/3492* (2013.01); *G01C 21/36* (2013.01);
(Continued)

(58) Field of Classification Search
CPC ............ G08C 2201/93; G08C 2201/91; G08C 2201/32; G08C 2201/70; H04W 4/02;
(Continued)

(56) References Cited

U.S. PATENT DOCUMENTS

2002/0072356 A1* 6/2002 Yamashita ........ H04M 1/72533
455/420
2003/0073432 A1* 4/2003 Meade, II .............. G08C 17/02
455/420

(Continued)

FOREIGN PATENT DOCUMENTS

| CN | 1452352 | 10/2003 |
|---|---|---|
| CN | 1463122 | 12/2003 |

(Continued)

OTHER PUBLICATIONS

International Search Report dated Dec. 6, 2013 for Application No. PCT/KR2013/007693, 4 pages.

(Continued)

*Primary Examiner* — Nimesh Patel
(74) *Attorney, Agent, or Firm* — Fish & Richardson P.C.

(57) ABSTRACT

The present invention relates to an electronic device capable of providing route information and a method for controlling same. An electronic device capable of providing route information according to an embodiment of the present invention includes a wireless communications unit, a search unit for searching out a destination inputted by the user, a display unit for setting, as a destination, one of the places searched out by the search unit and for displaying the route of the set destination, and a control unit for sending a control (Continued)

signal to control at least one electric home appliance based on an expected time of arrival at the destination.

17 Claims, 19 Drawing Sheets

(51) Int. Cl.
| | |
|---|---|
| *H04L 12/28* | (2006.01) |
| *H04L 12/12* | (2006.01) |
| *G01C 21/34* | (2006.01) |
| *H04L 12/64* | (2006.01) |
| *H04W 4/00* | (2009.01) |
| *H04W 4/04* | (2009.01) |
| *H04W 4/18* | (2009.01) |
| *H04W 8/24* | (2009.01) |
| *G01C 21/36* | (2006.01) |

(52) U.S. Cl.
CPC ........... *H04L 12/12* (2013.01); *H04L 12/2818* (2013.01); *H04L 12/6418* (2013.01); *H04W 4/008* (2013.01); *H04W 4/046* (2013.01); *H04W 4/18* (2013.01); *H04W 8/24* (2013.01)

(58) Field of Classification Search
CPC .................. H04W 4/008; H04W 4/021; H04W 4/043; H04W 4/005; H04W 4/027; H04W 8/005; H04W 4/00; H04W 4/025; H04W 4/046; H04W 4/18
See application file for complete search history.

(56) References Cited

U.S. PATENT DOCUMENTS

| | | | | |
|---|---|---|---|---|
| 2005/0249169 | A1* | 11/2005 | Fong | H04L 12/2803 370/338 |
| 2007/0073870 | A1* | 3/2007 | Park | G06F 3/0219 709/224 |
| 2007/0263600 | A1* | 11/2007 | Sutardja | H04M 1/72533 370/352 |
| 2009/0254272 | A1* | 10/2009 | Hendrey | G01C 21/3415 701/414 |
| 2010/0145609 | A1* | 6/2010 | Boss | G06Q 30/018 701/22 |
| 2010/0268401 | A1* | 10/2010 | Blakemore | G06Q 10/06 701/2 |
| 2011/0007901 | A1 | 1/2011 | Ikeda et al. | |
| 2011/0037712 | A1 | 2/2011 | Kim et al. | |
| 2011/0098915 | A1* | 4/2011 | Disatnik | G01C 21/3415 701/533 |
| 2015/0230056 | A1* | 8/2015 | Shin | H04W 4/008 455/420 |

FOREIGN PATENT DOCUMENTS

| | | |
|---|---|---|
| CN | 101138196 | 3/2008 |
| CN | 201138833 | 10/2008 |
| CN | 101990661 | 3/2011 |
| CN | 102244676 | 11/2011 |
| EP | 2 293 531 A1 | 3/2011 |
| JP | H10-239082 | 9/1998 |
| JP | 2001-264077 | 9/2001 |
| JP | 2006-041950 A | 2/2006 |
| JP | 3853898 | 12/2006 |
| KR | 10-2007-0098101 A | 10/2007 |
| KR | 10-2010-0091863 A | 8/2010 |
| KR | 10-2011-0035038 A | 4/2011 |
| KR | 10-2012-0072518 A | 7/2012 |

OTHER PUBLICATIONS

Extended European Search Report issued in European Application No. 13834702.6 on Jan. 20, 2016, 7 pages.
Office Action in Chinese Application No. 201380057651.8 on Aug. 17, 2016, 17 pages (with English translation).

* cited by examiner

ELECTRONIC DEVICE AND METHOD FOR CONTROLLING THE SAME

CROSS REFERENCE TO RELATED APPLICATIONS

This application is a U.S. National Phase Application under 35 U.S.C. §371 of International Application PCT/KR2013/007693, filed on Aug. 28, 2013, which claims the benefit of U.S. Provisional Application No. 61/696,307, filed on Sep. 4, 2012, and Korean Application No. 10-2013-0093705, filed on Aug. 7, 2013, the entire contents of which are hereby incorporated by reference in their entireties.

TECHNICAL FIELD

The present invention relates to an electronic device capable of providing route information, and a method for controlling the same.

BACKGROUND ART

With the fast development of the information age, importance of an information input/output function and a data storage function is urged in electronic devices. Such electronic devices capable of having those functions may be divided into portable electronic devices such as terminals and the like, and stationary electronic devices such as an image display device, a refrigerator and the like.

As it becomes multifunctional, an electronic device can be allowed to perform complicated functions, such as capture still images or moving images, play music or video files, play games, receive broadcast and the like, so as to be implemented as an integrated multimedia player. In addition, the electronic device provides a route for a place to which a user desires to go and route information on the place using global positioning system (GPS) signals. However, the electronic device is currently allowed to merely provide the route information and thus required to support other useful functions.

DISCLOSURE OF THE INVENTION

Therefore, to obviate those problems, an aspect of the detailed description is to provide an electronic device capable of automatically controlling a plurality of electric home appliances (or, simply home appliances) based on driving information (movement or travel information) relating to a vehicle while the vehicle moves, and a method for controlling the same.

To achieve these and other advantages and in accordance with the purpose of the present invention, as embodied and broadly described herein, there is provided an electronic device capable of providing route information, the electronic device including a wireless communication unit, a search unit that is configured to search out a destination input by a user, a display unit that is configured to set, as a destination, one of places searched out by the search unit and display a route of the set destination, and a controller that is configured to transmit a control signal for controlling at least one electric home appliance on the basis of an estimated time of arrival at the destination.

In one embodiment disclosed herein, the wireless communication unit may enable near field communication, and the controller may receive a setting for controlling the at least one home appliance from an external device through the wireless communication unit.

In one embodiment disclosed herein, the controller may decide a point to transmit the control signal to the at least one home appliance on the route, on the basis of control time information related to an operation of the at least one home appliance. The controller may also transmit a control signal for a relevant home appliance through the wireless communication unit every time of passing through the decided point.

In one embodiment disclosed herein, the control time information may be set by the user.

In one embodiment disclosed herein, the control time information may include at least one of operation start time information and operation end time information both related to the at least one home appliance.

In one embodiment disclosed herein, the wireless communication unit may receive updated traffic information from at least one external server. The controller decides the point to transmit the control signal on the basis of the received traffic information.

In one embodiment disclosed herein, the controller may output screen information, which allows the user to select a detour, on one region of the display unit on the basis of the traffic information.

In one embodiment disclosed herein, the controller may change the point to transmit the control signal to the at least one home appliance on the basis of the control time information, in response to the selection of the detour.

In one embodiment disclosed herein, the controller may output screen information, which is provided for changing the point to transmit the control signal relevant to the operation of the at least one home appliance, on one region of the display unit. The controller may also change the point to transmit the control signal based on a user selection through the screen information.

In one embodiment disclosed herein, the controller may output a graphic object corresponding to the at least one home appliance on a relevant point on the route.

In one embodiment disclosed herein, the graphic object may be implemented into at least one of an image, an icon or text corresponding to each of the at least one home appliance.

In one embodiment disclosed herein, control time information related to a home appliance corresponding to the graphic object may be output adjacent to the graphic object.

In one embodiment disclosed herein, the controller may change a point to transmit a control signal of a home appliance corresponding to the one graphic object, in response to a user's drag input.

In one embodiment disclosed herein, the controller may set an estimated time of arrival at the destination from the changed point, on the basis of control time information related to the home appliance corresponding to the one graphic object.

In one embodiment disclosed herein, the controller may output setting information related to the home appliance corresponding to the one graphic object on one region of the display unit.

In one embodiment disclosed herein, the setting information may include at least one of an operation time and an operation setting of a home appliance corresponding to a graphic object with a user's touch input applied thereto, and at least part of the setting information may be changed by a user selection.

To achieve these and other advantages and in accordance with the purpose of the present invention, as embodied and broadly described herein, there is provided a method for controlling an electronic device capable of providing route information, the method including setting a route up to a destination, receiving control signal for controlling at least one home appliance, and transmitting the control signal for controlling the at least one home appliance on the basis of an estimated time or arrival at the destination.

In one embodiment disclosed herein, the transmitting of the control signal may include calculating the estimated time of arrival at the destination along the set route, loading control time information related to an operation of the at least one home appliance, deciding a point to transmit a control signal to the at least one home appliance on the basis of the control time information, determining whether or not the decided point has passed through, and transmitting a control signal to a home appliance corresponding to the passed point according to the determination result.

To achieve these and other advantages and in accordance with the purpose of the present invention, as embodied and broadly described herein, there is provided an automatic control system interoperable with an electronic device capable of providing route information, the system including an electronic device that is configured to transmit a control signal for remotely controlling at least one home appliance on the basis of an estimated time of arrival at a destination, a home network server that is configured to remotely control a relevant home appliance by receiving the control signal, and at least one home appliance connected to the home network server in a wireless manner and remotely controlled by the home network server.

In one embodiment disclosed herein, the electronic device may decide a point to transmit the control signal to the at least one home appliance on the route, on the basis of control time information related to an operation of the at least one home appliance and the estimated time of arrival at the destination, and transmit the control signal to a home appliance corresponding to the decided point every time of passing through the decided point.

ADVANTAGEOUS EFFECT

In accordance with the detailed description, an electronic device according to one embodiment and a control method thereof may allow a navigator to be connected to a plurality of electric home appliances through a home network such that each electric home appliance can be automatically controlled, which may result in providing a user with more convenient life.

An electronic device according to one embodiment and a control method thereof may allow a plurality of electric home appliances to be operated according to an estimated time of arrival at a destination, even without a user's direct control.

MODES FOR CARRYING OUT THE PREFERRED EMBODIMENTS

Figure 1:
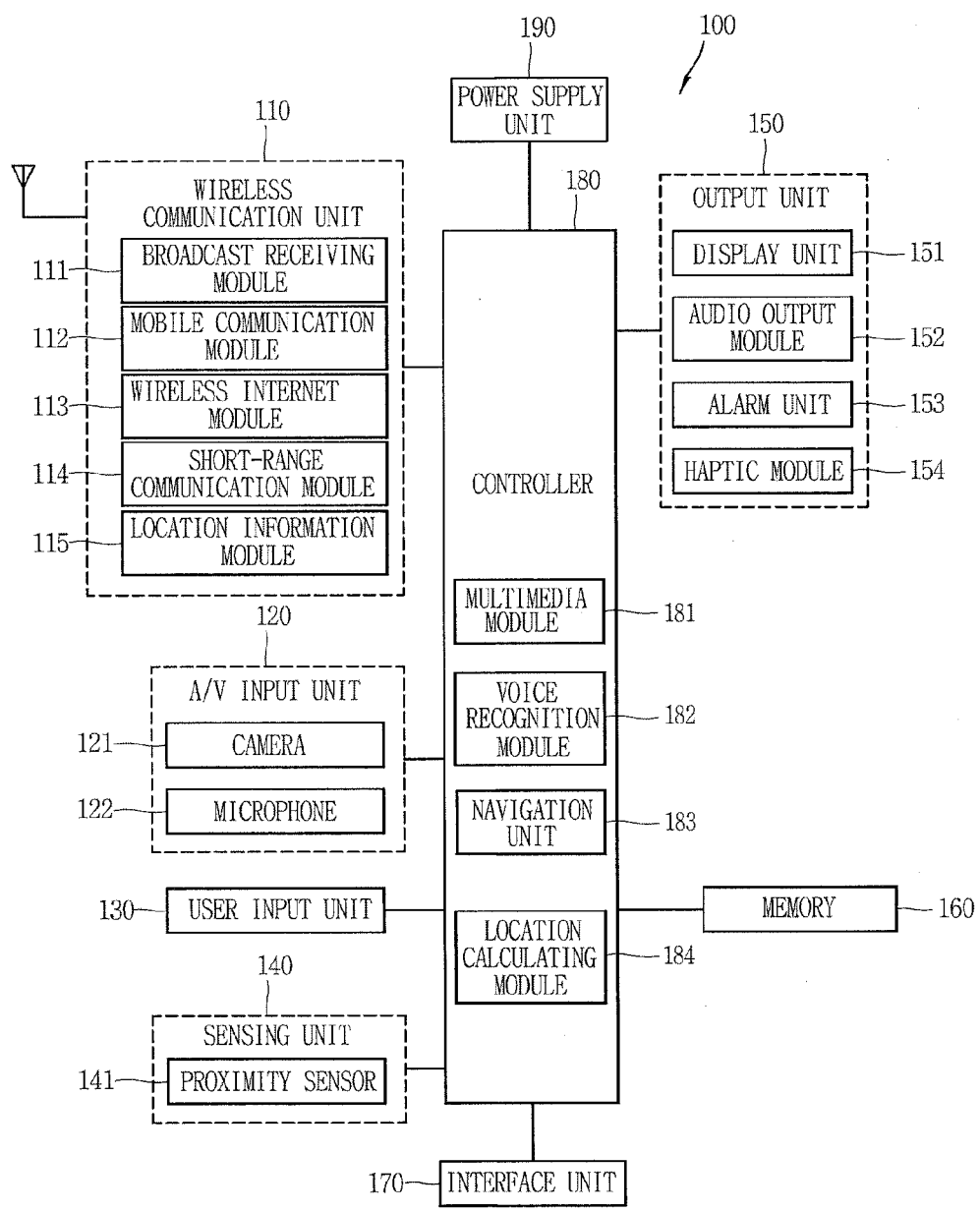
FIG. 1 is a block diagram of an electronic device in accordance with one exemplary embodiment of the present invention.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

In addition, a suffix "module" or "unit" used for constituent elements disclosed in the following description is merely intended for easy description of the specification, and the suffix itself does not give any special meaning or function.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Electronic devices presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, telematics terminals and the like. By way of non-limiting example only, further description will be made with reference to particular types of electronic devices such as cellular phones or smart phones. However, such teachings apply equally to portable electronic devices, such as PMPs, without using communication networks, and also to stationary terminals such as digital TV, desktop computers, and the like.

As illustrated in FIG. 1, the electronic device 100 may include a wireless communication unit 110, an Audio/Video (NV) input unit 120, a user input unit 130, a sensing unit 140, an output unit 150, a memory 160, an interface unit 170, a controller 180, a power supply unit 190, and the like. However, all of the elements as illustrated in FIG. 1 are not necessarily required, and the electronic device may be implemented with greater or less number of elements than those illustrated elements.

The wireless communication unit 110 typically includes one or more elements allowing radio communication between the electronic device 100 and a wireless communication system, or allowing radio communication between the electronic device 100 and a network in which the electronic device 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the electronic device 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may also be provided through a mobile communication network, and in this case, the broadcast associated information may be received by the mobile communication module 112. The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems. Broadcast signals and/or broadcast associated information received via the broadcast receiving module 111 may be stored in a suitable device, such as a memory 160.

The mobile communication module 112 transmits and/or receives a radio signal to and/or from at least one of a base station, an external terminal and a server over a mobile communication network. In this exemplary embodiment, the radio signal may include a voice call signal, a video call signal and/or various types of data according to text and/or multimedia message transmission and/or reception.

The wireless Internet module 113 is a module for supporting wireless Internet access. The wireless Internet module 113 may be built-in or externally installed to the electronic device 100. In this exemplary embodiment, the wireless Internet module 113 may use a wireless Internet access technique including a Wireless LAN (WLAN), Wi-Fi, Wireless Broadband (Wibro), World Interoperability for Microwave Access (Wimax), High Speed Downlink Packet Access (HSDPA), and the like.

The short-range communication module 114 is a module for supporting a short-range (or near field) communication. In this exemplary embodiment, it may be used a short-range communication technology including Bluetooth, Radio Frequency IDentification (RFID), Infrared Data Association (IrDA), Ultra WideBand (UWB), ZigBee, Wireless LAN (protocols, such as Bluetooth, 802.11n, etc.) and the like.

Or, a near field communication (NFC) protocol or the like may also be used as the short-range communication module 114. In this instance, the short-range communication module 114 may receive information relating to at least one home appliance from an NFC tag. The information received through the short-range communication module 114 may then be stored in the memory 160. Or, the short-range communication module 114 may transmit the information related to the at least one home appliance stored in the memory 160 to an external device.

The location information module 115 is a module for checking or acquiring a location of the electronic device (a location of a vehicle can be checked when the electronic device is mounted in the vehicle). The location information module 115 may be a GPS module, for example. The GPS module receives location information from a plurality of satellites. Here, the location information may include coordinate information represented by latitude and longitude values. For example, the GPS module may measure an accurate time and distance from three or more satellites, and accurately calculate a current location of the electronic device according to trigonometry based on the measured time and distances. A method of acquiring distance and time information from three satellites and performing error correction with a single satellite may be used. In particular, the GPS module may acquire an accurate time together with three-dimensional speed information as well as latitude, longitude and altitude values from the location information received from the satellites. As the location information module 115, a Wi-Fi location system and/or hybrid positioning system may be used.

Also, the wireless communication unit 110 may transmit a control signal for controlling at least one home appliance. Or, the wireless communication unit 110 may receive information related to at least one home appliance from an external device or server or a base station. To this end, the wireless communication unit 110 may use at least one of the mobile communication module 112, the wireless Internet module 113 or the short-range communication unit 114.

The wireless communication unit 110 may receive updated traffic information from at least one external server. The received traffic information may be stored in the memory 160 and used by the controller 180 in various forms.

The A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151.

The image frames processed by the camera 121 may be stored in the memory 160 (or other storage medium) or transmitted via the wireless communication unit 110. Two or more cameras 121 may be provided according to the configuration of the electronic device.

The microphone 122 may receive external sounds (audible data) via a microphone (or the like) in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate input data from commands entered by a user to control various operations of the electronic device. The user input unit 130 may include a keypad, a dome switch, a touch pad (e.g., pressure/capacitance), a jog wheel, a jog switch, and the like. In particular, when the touch pad is overlaid on the display unit 151 in a layered manner, it may form a touch screen.

The sensing unit 140 detects a current status (or state) of the electronic device 100 such as an opened or closed state of the electronic device 100, a location of the electronic device 100, the presence or absence of user contact with the electronic device 100 (e.g., touch inputs), the orientation of the electronic device 100, an acceleration or deceleration movement and direction of the electronic device 100, etc., and generates sensing signals for controlling the operation of the electronic device 100. For example, when the electronic device 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The sensing unit 140 may include a proximity sensor, a pressure sensor, a motion sensor and the like. The proximity sensor may detect presence or absence of an object approaching the electronic device 100, or an object located near the electronic device 100, without a mechanical contact. The proximity sensor may detect a nearby object using changes in alternating-current (AC) magnetic fields or static magnetic fields or a rate of change in capacitance. The proximity sensor may be provided by at least two in number according to its configuration form.

The pressure sensor may detect presence or absence of pressure applied to the electronic device 100, strength of the pressure, and the like. The pressure sensor may be provided at a portion of the electronic device 100 for which pressure detection is required according to a usage environment. If the pressure sensor is installed on the display unit 151, a touch input through the display unit 151 and a pressure touch input which is applied with stronger pressure than the touch input can be discriminated according to a signal output from the pressure sensor. Also, when a pressure touch input is applied, the strength of pressure applied to the display unit 151 may be discriminated according to the signal output from the pressure sensor.

The motion sensor senses a location or a movement of the electronic device 100 using an acceleration sensor, a gyro sensor and the like. The acceleration sensor which may be used by the motion sensor is a component for converting a change in acceleration in one direction into an electric signal, and is widely used with the development of the micro-electromechanical systems (MEMS) technology. There are various types of acceleration sensors, starting from a type of acceleration sensor which is embedded in an airbag system of a vehicle to measure a great acceleration value which is used for sensing collision to a type of acceleration sensor which recognizes a minute motion of a human hand so as to measure a minute acceleration value used as an input unit for a game or the like. The acceleration sensor is typically configured by providing two or three axes into one package, and if necessary, uses only Z-axis depending on a usage environment. Therefore, when an acceleration sensor in the X-axis or Y-axis, other than the Z-axis, has to be used for some reason or other, an acceleration sensor may be installed by being erected on a main substrate using a separate piece of substrate.

The gyro sensor is a sensor of measuring angular velocity, and may sense a turned direction from a reference direction.

The output unit 150 is typically configured to output various types of information, such as audio, video, alarm, and the like. The output unit 150 is shown having a display unit 151, an audio output module 152, an alarm unit 153, and the like.

The display unit 151 may output information processed in the electronic device 100. For example, when the electronic device 100 is operating in a phone call mode, the display unit 151 may provide a User Interface (UI) or a Graphic User Interface (GUI), which includes information associated with the call. As another example, if the electronic device is in a video call mode or a capture mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, and the like. The display unit 151 may be implemented in two or more in number according to a configured aspect of the electronic device 100. For instance, the electronic device 100 may be provided simultaneously with both of an external display unit (not illustrated) and an internal display unit (not illustrated).

Here, if the display unit 151 and a touch sensitive sensor (referred to as a 'touch sensor') have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of pressure applied to a specific part of the display unit 151 or changes of capacitance occurring from a specific part of the display unit 151, into electric input signals. Also, the touch sensor may be configured to sense not only a touched position and a touched area, but also touch pressure. When touch inputs are sensed by the touch sensors, corresponding signals may be transmitted to a touch controller (not illustrated). The touch controller may process the received signals, and then transmit corresponding data to the controller 180. Accordingly, the controller 180 may sense which region of the display unit 151 has been touched.

The proximity sensor may be arranged at an inner region of the electronic device covered by the touch screen, or near the touch screen. The proximity sensor refers to a sensor to sense presence or absence of an object approaching to a surface to be sensed, or an object disposed near a surface to be sensed, by using an electromagnetic field or infrared rays without a mechanical contact. The proximity sensor may have a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen may be sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position will correspond to a position where the pointer faces perpendicular to the touch screen upon the proximity touch of the pointer.

The proximity sensor may sense proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible output signals related to a particular function (e.g., a call signal reception sound, a message reception sound, etc.) performed by the electronic device 100. The audio output module 152 may include a receiver, a speaker, a buzzer or the like.

The alarm unit 153 may output a signal for informing about an occurrence of an event of the electronic device 100. Events generated in the electronic device, for example, may include call signal reception, message reception, key signal inputs, a touch input, etc. In addition to video or audio signals, the alarm unit 153 may output signals in a different manner, for example, using vibration to inform of an occurrence of an event. For example, the alarm unit 153 may output a signal in a vibrating manner. When a call signal or a message is received, the alarm unit 153 may vibrate the electronic device through a vibration means to notify the reception. Or, when a key signal is input, the alarm unit 153 may vibrate the electronic device 100 through the vibration means as a feedback with respect to the key signal input. The vibration may allow the user to recognize the event generation. Of course, signals for notifying the event generation may also be output via the display unit 151 and the audio output module 152.

A haptic module 154 may generate various tactile effects that user may feel. A typical example of the tactile effect generated by the haptic module 155 is vibration. Strength, pattern and the like of the vibration generated by the haptic module 154 may be controllable. For example, different vibrations may be combined to be outputted or sequentially outputted.

Besides vibration, the haptic module 154 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 154 may be implemented to allow the user to feel a tactile effect through a muscle sensation such as the user's fingers or arm, as well as transferring the tactile effect through a direct contact. The haptic module 154 may be provided by two or more according to a configured aspect of a telematics terminal. The haptic module 154 may be provided at a place of frequently coming in contact with a user in a vehicle, for example, a steering wheel, a gear lever, a seat and the like.

The memory 160 may store programs used for operations performed by the controller, or may temporarily store input and/or output data (for example, a phonebook, messages, still images, video, etc.).

Also, the memory 160 may store control time information relating to at least one home appliance. Here, the control time information may include at least one of operation start time information or operation end time information for starting or ending (or turning on or off) the operation of the at least one home appliance after a specific time. Or, the memory 160 may store setting information relating to an operation of the home appliance. The memory 160 may also store information related to a control signal for controlling each home appliance.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the electronic device 100 may be operated in relation to a web storage device that performs the storage function of the memory 160 over the Internet.

The interface unit 170 may serve as an interface with every external device connected with the electronic device 100. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like. The identification module may be a chip that stores various information for authenticating authority of using the electronic device 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the electronic device 100 via a port. The interface unit 170 may receive data transmitted from an external device, receive power to transfer to each element within the electronic device 100, or transmit internal data of the electronic device 100 to an external device.

When the electronic device 100 is connected with an external cradle, the interface unit 170 may serve as a passage to allow power from the cradle to be supplied to the electronic device 100 therethrough or may serve as a passage to allow various command signals input by the user from the cradle to be transferred to the electronic device therethrough. Various command signals or power input from the cradle may operate as signals for recognizing that the electronic device is properly mounted on the cradle.

The controller 180 may typically control the general operations of the electronic device 100. For example, the controller 180 may perform controlling and processing associated with voice calls, data communications, video calls, and the like. The controller 180 may include a multimedia module 181 for playbacking multimedia data. The multimedia module 181 may be configured within the controller 180 or may be configured to be separated from the controller 180.

The controller 180 may perform pattern recognition processing to recognize a handwriting input or a picture drawing input performed on the touch screen as characters and images, respectively.

In the meantime, the electronic device 100 according to the embodiment disclosed herein may include a user input unit 122, 130 or 151 through which a search word for searching out a destination is input, and a navigation unit 183 which extracts route information related to the destination corresponding to the search word and calculates an estimated time of arrival at the destination. The navigation unit 183 may be configured within the controller 180 or may be configured to be separated from the controller 180.

The electronic device 100 according to the embodiment disclosed herein may control at least one preset home appliance, on the basis of the estimated time of arrival at the destination. For example, the controller 180 may control the wireless communication unit 110 to transmit a control signal for controlling the at least one home appliance according to the estimated time of arrival from a current location of the electronic device 100, received from the location information module 115, up to the destination. Here, the control signal may be based on information related to a control signal, which is separately stored in the memory 160 for each home appliance.

Here, the controller 180 may predecide a point for transmitting the control signal. For example, the controller 180 may decide at least one point for transmitting the control signal on a route set by a navigation session 250, and control a control signal for a home appliance corresponding to the decided point to be transmitted at the time of passing through the decided point.

Here, in order to decide the point to transmit the control signal, the controller 180 may use control time information related to an operation of at least one home appliance, stored in the memory 160. For example, the controller 180 may be provided with a location calculating module 184 to decide the point for transmitting the control signal using the control time information. The location calculating module 184 may be configured within the controller 180 or may be configured to be separated from the controller 180.

The controller 180 may decide a point on a route, at which the estimated time of arrival at the destination corresponds to a time designated by the control time information, as the point at which the control signal is transmitted, by use of the location calculating module 184. If the control time information corresponds to operation start time information related to a specific home appliance, the controller 180 may decide a point on a route, at which the estimated time of arrival at the destination corresponds to the operation start time, as the point for transmitting the control signal.

In this instance, when the current location of the electronic device 100 is checked to have passed through the decided point through the location information module 115 of the electronic device 100, then the controller 180 may transmit a control signal for operating (turning on) the specific home appliance. Hence, the specific home appliance can automatically operate at an appropriate time that the user desires even though the user does not operate it directly.

The controller 180 may output a graphic object of a home appliance, which corresponds to a control signal to be transmitted, at at least one control signal transmission point decided based on the estimated time of arrival at the destination and the control time information, on the display unit 151. Therefore, the display unit 151 may output the route information, the decided at least one point, and the graphic object for the home appliance corresponding to each point. The graphic object may also include control time information which has been set for the corresponding home appliance.

When at least one of the graphic objects is moved to another point, the controller 180 may change the control signal transmission point to correspond to the moved at least one graphic object. That is, as the user moves at least one graphic object, the controller 180 may change the point where a control signal is transmitted to a home appliance corresponding to the at least graphic object.

The power supply unit 190 may receive external power or internal power and supply appropriate power required for operating respective elements and components under the control of the controller 180.

Various embodiments described herein may be implemented in a computer-readable or its similar medium using, for example, software, hardware, or any combination thereof. For hardware implementation, the embodiments described herein may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electronic units designed to perform the functions described herein. In some cases, such embodiments may be implemented by the controller 180 itself. For software implementation, the embodiments such as procedures or functions described herein may be implemented by separate software modules.

Software codes can be implemented by a software application written in any suitable programming language. The software codes may be stored in the memory 160 and executed by the controller 180.

The voice recognition module 182 recognizes a user's voice, and executes a corresponding function according to the recognized voice signal.

When the controller 180 is implemented in software configuration, embodiments such as procedures or functions may be implemented by a separate software module which performs at least one function or operation. Such software codes may be implemented by a software application written in any suitable programming language. Also, the software codes may be executed by the controller 180.

According to the embodiments disclosed herein, the electronic device 100 may execute communication with a vehicle terminal 350 which is attached to a vehicle 250 through the wireless communication unit 110. The vehicle terminal 350 may control the vehicle 250 or transmit information related to the vehicle 250. For example, the vehicle terminal 350 may provide information related to the vehicle 250, such as velocity of the vehicle 250, a gear state and the like, control a turn-on/off of an emergency light of the vehicle 250, control a turn-on/off of a headlight, determine whether or not a passenger has seated through a detection sensor disposed on a seat within the vehicle 250, or control blowing of a horn. Also, the vehicle terminal 350 may include a head-up display (HUD) or a projector.

In detail, according to the embodiments disclosed herein, the controller 180 of the electronic device 100 may control the display unit 151 of the electronic device 100 to output route information relating to the destination, and additionally provide the route information through communication with the vehicle terminal 350.

Therefore, the controller 180 may control the vehicle terminal 350 to output the route information on a dashboard of the vehicle 250, or to output the route information on the front glass of the vehicle 250 using the HUD or the projector. The HUD may be mounted on the dashboard of the vehicle 250. The HUD and the projector may be used in generally well-known manners, so detailed description will be omitted.

Figure 2:
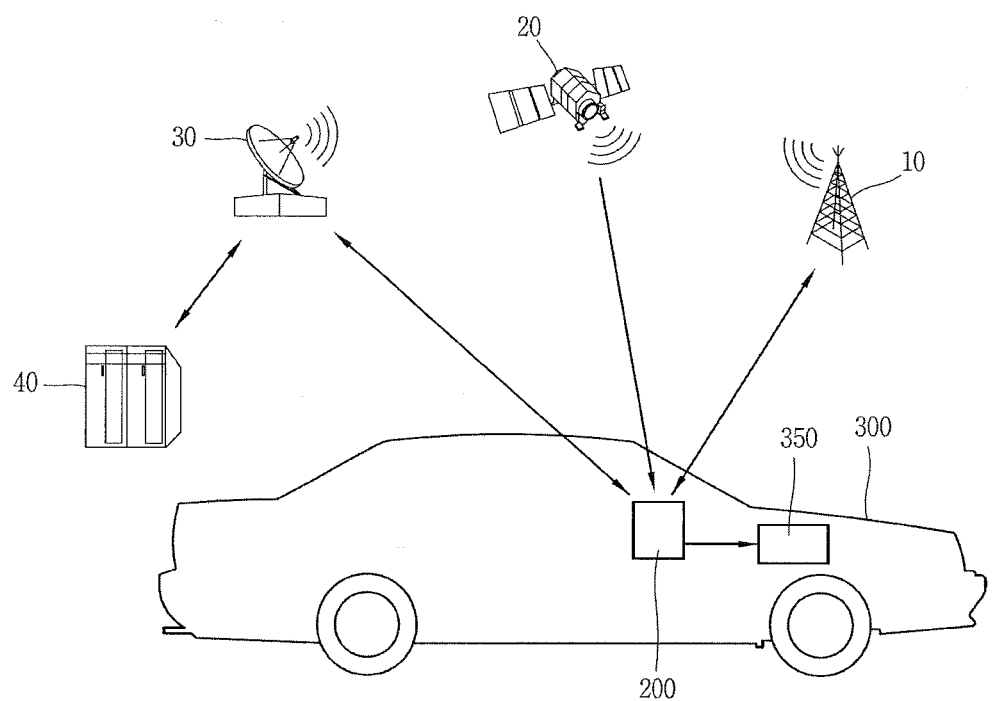
FIG. 2 is a block diagram of a telematics terminal system in accordance with one exemplary embodiment of the present invention.

FIG. 2 is a block diagram of a telematics terminal system in accordance with one exemplary embodiment of the present invention.

As illustrated in FIG. 2, a telematics terminal system for a vehicle may include an information providing center 40 that provides traffic information and various data (e.g., programs, execution files, etc.), and a telematics terminal 200 that is mounted within a vehicle, receives traffic information via a remote wireless communication network 30 and/or short-range wireless communication network, and provides a road guidance service based on a GPS signal received via a satellite 20 and the traffic information. Here, the communication network may further include wired/wireless communication networks such as local area network (LAN) and wide area network (WAN).

Various traffic information (for example, road traffic information, point of interest (POI) information) in addition to traffic light information may be collected via the communication network, and the collected information may be processed according to a transport protocol expert group (TPEG) standard in the information providing center 40 (for example, a server), to be sent to a broadcast station. The broadcast station may then insert the traffic information including the traffic light information into a broadcast signal and broadcast it to the telematics terminal 200. Here, the traffic light information may also be received from a server (not illustrated) which is installed in a traffic light when the vehicle moves close to the traffic light.

The server may reconfigure (reconstruct) a digital broadcast service through various routes connected to the communication network, for example, an operator input, wired/wireless Internet, transparent data channel (TDC) and multimedia object transport (MOC), and various traffic information collected from a different server or a probe car, into a traffic information format such as a format in conformity with the TPEG standard, a standard for a traffic information service. The server may then transmit the reconfigured information to the broadcast station.

The server may generate traffic information of a TPEG format including traffic light information, and transmit the generated traffic information to the broadcast station.

The broadcast station may insert the traffic information including the traffic light information, which has been received from the server, into a broadcast signal and wirelessly transmit the broadcast signal to the telematics terminal 200 mounted in the vehicle performing the role of a traffic information receiving terminal, for example, to a navigator. The traffic information may include the traffic light information, and additionally include information relating to various traffic conditions, which are required for operating the road, sea and air transportation, such as an accident, a road condition, traffic congestion, road construction, a road closure, a public traffic network delay, an air transportation holdup and the like.

The broadcast station may receive the processed traffic information including the traffic light information from the server and transmit it to the telematics terminal 200 through a digital signal in conformity with various digital broadcasting standards. Here, the broadcast standards may include various types of digital broadcast standards, such as a Europe-oriented digital audio broadcasting (DAB) standard based on Eureca-147 [ETSI EN 300 401], terrestrial or satellite digital multimedia broadcasting (DMB) standard, a terrestrial digital video broadcasting (DVB-T) standard, a digital video broadcasting-handheld (DVB-H) standard, a media forward link only (MFLO) standard, and the like.

Also, the broadcast station may transmit the traffic information including the traffic light information via a wired/wireless network such as wired/wireless Internet.

The vehicle having the telematics terminal 200 refers to every carrier, which can be implemented by using a mechanical and electronic device for the purpose of transporting people or objects, such as general passenger cars, buses, trains, ships, aircraft, and the like.

The vehicle may include a traffic information reception terminal mounted therein, receive the traffic light information from the broadcast station using the mounted traffic information reception terminal, process the traffic light information, and transfer the processed traffic light information to a user through graphic, text and/or audio.

Meanwhile, the telematics terminal 200 may include a mobile communication module. The mobile communication module transmits and receives wireless signals to and from at least one of the base station 10, an external terminal and a server. Here, the wireless signal may include a voice call signal, a telephony call signal, and/or various types of data resulting from text/multimedia message transmission and reception.

The telematics terminal 200 performs communication with the vehicle terminal 350 in a wired/wireless communication manner. The vehicle terminal 350 performs general vehicle controls, provides information related to the vehicle 250, such as velocity of the vehicle 250, a gear state and the like, controls a turn-on/off of an emergency light of the vehicle 250, controls a turn-on/off of a headlight, determines whether or not a passenger has seated through a detection sensor disposed on a seat within the vehicle 250, or controls blowing of a horn. Also, the vehicle terminal 350 may include a head-up display (HUD) or a projector.

Hereinafter, description will be given of the configuration of the telematics terminal 200 according to an exemplary embodiment.

Figure 3:
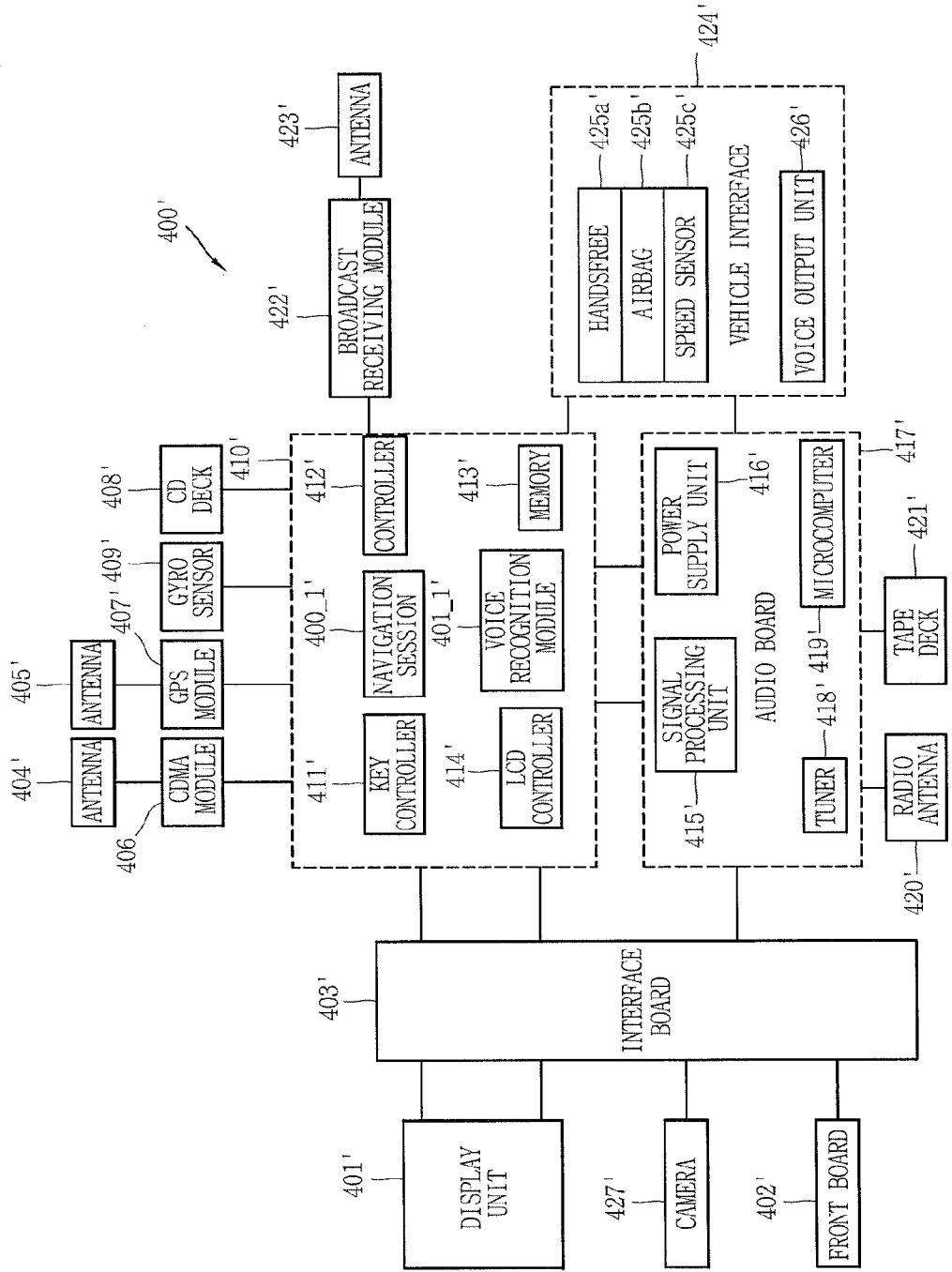
FIG. 3 is a block diagram illustrating a configuration of a telematics terminal in accordance with one exemplary embodiment of the present invention.

FIG. 3 is a block diagram showing a configuration of a telematics terminal 200 in accordance with an exemplary embodiment disclosed herein.

As illustrated in FIG. 3, the telematics terminal 200 may include a main board 210 including a controller (for example, a central processing unit (CPU)) 212 for overall control of the telematics terminal 200, a memory 213 for storing various information, a key controller 211 for controlling various key signals, and an LCD controller 214 for controlling an LCD.

The memory 213 may store map information (map data) for displaying road guidance information on a digital map. The memory 213 may additionally store a traffic information collecting control algorithm for inputting traffic information according to the situation of a road along which the vehicle currently travels (runs), and information for controlling the algorithm.

The main board 210 may include a wireless communication module 206 that enables wireless communication between the telematics terminal 200 and a wireless communication system or between the telematics terminal 200 and a network to which the telematics terminal 200 belongs, a location information module 207 that receives a GPS signal for announcing a location of the vehicle and tracking a travel route from a start point to a destination, or transmitting traffic information collected by the user via the GPS signal, a compact disk (CD) deck 208 that reproduces a signal recorded in the CD, a gyro sensor 209 and the like. The wireless communication module 206 and the location information module 207 may transmit and receive signals via antennas 204 and 205.

The wireless communication module 206 is a mobile electronic device with a specific device number. The wireless communication module 206 may include a mobile communication module 206a to transmit and receive wireless signals to and from at least one of a base station, an external terminal and a server over a mobile communication network, a wireless Internet module 206b to access a wireless Internet by using a wireless Internet access technique including Wireless LAN (WLAN), Wi-Fi, Wireless Broadband (Wibro), World Interoperability for Microwave Access (Wimax), High Speed Downlink Packet Access (HSDPA), and the like, and a short-range (or near field) communication module 206c to perform communication by using a short-range communication technology including Bluetooth, Radio Frequency IDentification (RFID), Infrared Data Association (IrDA), Ultra WideBand (UWB), ZigBee, Wireless LAN (protocols, such as Bluetooth, 802.11n, etc.) and the like.

A broadcast receiving module 222 may be connected with the main board 210 and receive a broadcast signal via an antenna 223. The main board 210 may be connected via an interface board 203 with a display unit (i.e., an LCD) 201 controlled by the LCD controller 214, a front board 202 controlled by the key controller 211, and a camera 227 for capturing the interior and/or the exterior of the vehicle. The display unit 201 may display various video signals and character signals, and the front board 202 may include buttons for various key signal inputs and provide a key signal corresponding to a button selected by the user to the main board 210. In some instances, the display unit 201 may include a proximity sensor of FIG. 2 and a touch sensor (touch screen).

The front board 202 may include a menu key for directly inputting traffic information. The menu key may be controlled by the key controller 211.

An audio board 217 may be connected to the main board 210 and process various audio signals. The audio board 217 may include a microcomputer 219 for controlling the audio board 217, a tuner 218 for receiving a radio signal, a power supply unit 216 for supplying power to the microcomputer 219 and a signal processing unit 215 for processing various voice signals.

The audio board 217 may also include a radio antenna 220 for receiving a radio signal and a tape deck 221 for playing an audio tape. The audio board 217 may further include an audio output unit (for example, an amplifier) 226 for outputting a voice signal processed by the audio board 217.

The audio output unit (amplifier) 226 may be connected to a vehicle interface 224. Namely, the audio board 217 and the main board 210 may be connected to the vehicle interface 224. A hands-free module 225a for receiving a voice signal, an airbag 225b configured for the security of a passenger, a speed sensor 225c for detecting the speed of the vehicle and the like may be connected to the vehicle interface 224. The speed sensor 225c may calculate a vehicle speed and provide the calculated vehicle speed information to the CPU 212.

A navigation session 300 applied to the telematics terminal 200 may generate road guidance information based on the map data and current location information of the vehicle and provide the generated road guidance information to a user.

The display unit 201 may detect a proximity touch within a display window via the proximity sensor. For example, when a pointer (e.g., user's finger or stylus) give a proximity touch, the display unit 201 may detect the position of the proximity touch and output position information corresponding to the detected position to the controller 212.

A voice recognition device (or a voice recognition module) 301 may recognize a voice pronounced by the user and perform a corresponding function according to the recognized voice signal.

The navigation session 300 applied to the telematics terminal 200 may display a travel route on map data.

Meanwhile, the telematics terminal 200 to which the electronic device according to the embodiments disclosed herein is applied may include a user input unit to allow inputting of a search word for searching out a destination, and a navigation session 300 to extract route information relating to the destination corresponding to the search word.

The telematics terminal 200 may control at least one preset home appliance on the basis of an estimated time of arrival at the destination. For example, the controller 212 may control the wireless communication module 206 to transmit a control signal for controlling the at least one home appliance according to the estimated time of arrival, which is from a current location checked by the location information module 207 up to the destination.

Here, the controller 212 may decide at least one point, at which the control signal is to be transmitted, on the route set by the navigation session 300. The controller 212 may use control time information related to an operation of at least one home appliance, stored in the memory 160, in order to decide the point to transmit the control signal.

The controller 212 may decide a point, at which the estimated time of arrival at the destination corresponds to a time designated based on the control time information, as the point to transmit the control signal. When the current location of the telematics terminal 200 is checked to have passed through the decided point, then the controller 212 may control the wireless communication module 206 to transmit a control signal for controlling a specific home appliance to the specific home appliance. Therefore, the specific home appliance can be automatically activated (turned on, operated) at an appropriate time that the user desires, even though the user directly turns on the home appliance.

The controller 212 may control the display unit 201 to output a graphic object of a home appliance, which corresponds to a control signal to be transmitted, on at least one control signal transmission point decided based on the estimated time of arrival at the destination and the control time information. Accordingly, the display unit 201 may output the route information, the decided at least one point, and the graphic object for a home appliance corresponding to each point. The graphic object may also include control time information which has been set for a corresponding home appliance.

When at least one of the graphic objects moves to another point, the controller 212 may change the control signal transmission point to correspond to the moved at least one graphic object. That is, in response to the user moving at least one graphic object, the controller 212 may change a point at which a control signal for a home appliance corresponding to the moved at least one graphic object is to be transmitted.

According to the exemplary embodiment disclosed herein, the telematics terminal 200 may perform communication with the vehicle terminal 350 mounted in the vehicle 250 through the wireless communication module 206. The vehicle terminal 350 is a device which controls the vehicle 250 having the vehicle terminal 350 mounted therein or transmits information relating to the vehicle 250. For example, the vehicle terminal 350 provides information related to the vehicle 250, such as velocity of the vehicle 250, a gear state and the like, controls a turn-on/off of an emergency light of the vehicle 250, controls a turn-on/off of a headlight, determines whether or not a passenger has seated through a detection sensor disposed on a seat within the vehicle 250, or controls blowing of a horn. Also, the vehicle terminal 350 may include a head-up display (HUD) or a projector.

Therefore, the controller 212 may control the vehicle terminal 350 to output the route information on a dashboard of the vehicle 250, or to output the route information on the front glass of the vehicle 250 using the HUD or the projector. The HUD may be mounted on the dashboard of the vehicle 250. The HUD and the projector may be used in generally well-known manners, so detailed description will be omitted.

Meanwhile, the electronic device 100 according to the embodiment disclosed herein may control at least one preset home appliance on the basis of an estimated time of arrival at the destination. That is, the controller 180 may control the wireless communication unit 110 to transmit a control signal for controlling the at least one home appliance according to the estimated time of arrival from a current location to the destination. Here, the control signal transmitted by the wireless communication unit 110 may be transmitted to a relevant home appliance through a wireless network. The relevant home appliance may thusly be driven according to the control of the transmitted control signal.

Figure 4:
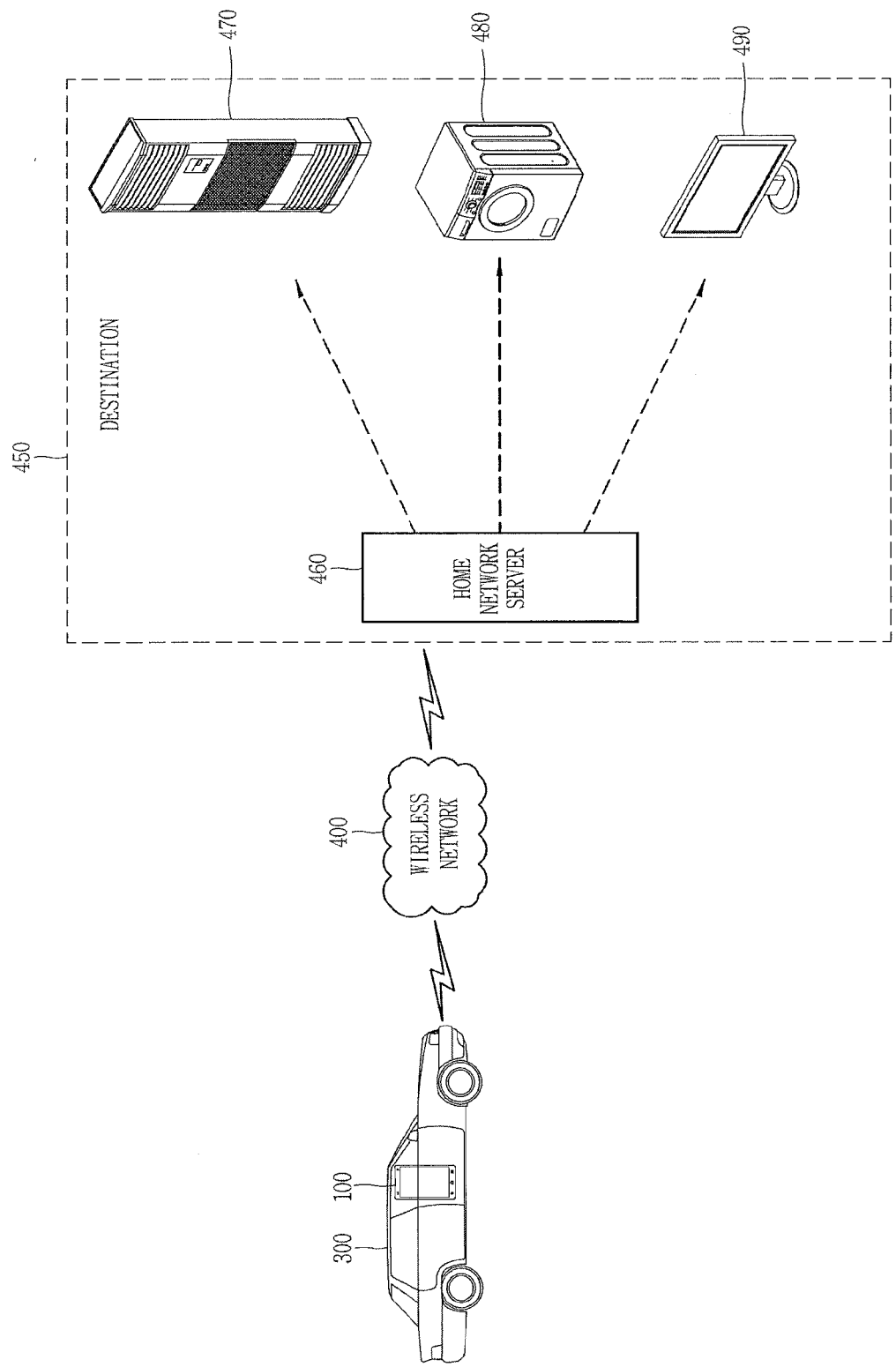
FIG. 4 is a block diagram of a home network system interoperable with an electronic device in accordance with one exemplary embodiment of the present invention.

FIG. 4 is a block diagram of a home network system interoperable with an electronic device in accordance with one exemplary embodiment of the present invention.

As illustrated in FIG. 4, the electronic device 100 according to the one embodiment disclosed herein may access a home network 450 of a destination through a wireless network 400. Here, the home network 450 includes a home network server 460 and a plurality of electric home appliances (for example, an air conditioner 470, a washing machine 480 and a digital video recorder (DVR) 490) which are connectable with the home network server 460.

Here, the home network server may be connected with the home appliances in a wired or wireless manner. For example, the home network server 460 may be connectable with the home appliances 470, 480 and 490 in a wired connection manner such as home phoneline networking appliance (PNA) using a telephone line, IEEE 1394, power line communication (PLC) and the like, and a wireless connection manner such as home radio frequency (RF), Bluetooth, infrared data association (IrDA) and the like.

The home network server 460 receives a control signal from the electronic device 100 via the wireless network 400, and controls a relevant home appliance to be turned on according to the received control signal. Accordingly, the electronic device 100 can remotely control a plurality of home appliances located at the destination.

Here, the home network server 460 may also be the electronic device 100 according to the embodiment disclosed herein. For example, a mobile terminal, in which an application is installed or software is embedded or preinstalled to remotely control the plurality of home appliances 470, 480 and 490, can also be utilized as the home network server 460.

For a mobile terminal which has a preinstalled navigation software, an embedded navigation function, or a navigation function through a downloaded application, it can also be utilized as the electronic device 100. That is, for a mobile terminal which is allowed to perform the remote control function and the navigation function through an embedded or preinstalled software or a downloaded application, the mobile terminal can be utilized as the electronic device 100 and the home network server 460.

Hereinafter, description will be given in more detail of a method for remotely controlling at least one home appliance based on an estimated time of arrival at a destination with reference to the configuration of the electronic device illustrated in FIG. 1, along with the accompanying drawings.

The electronic device according to the embodiment disclosed herein may transmit a control signal for controlling at least one home appliance to a relevant home appliance on the basis of an estimated time of arrival at a destination, such that a user can activate or deactivate a selected home appliance at a desired timing. To this end, the electronic device 100 according to the embodiment disclosed herein decides at least one point to transmit the control signal on the basis of the estimated time of arrival at the destination. The control signal can thusly be transmitted to a relevant home appliance every time when the vehicle or the electronic device 100 passes through the decided at least one point.

Figure 5:
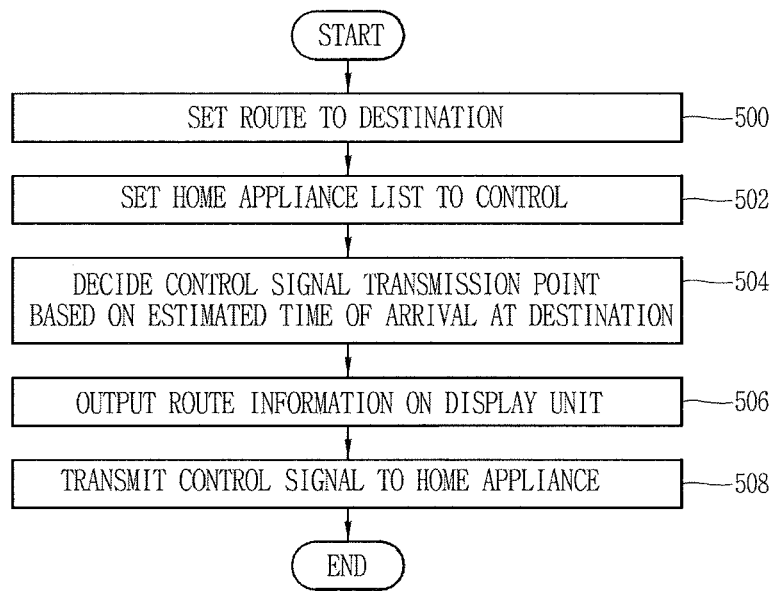
FIG. 5 is a flowchart illustrating a method for controlling an electronic device in accordance with one exemplary embodiment of the present invention.
Figure 6:
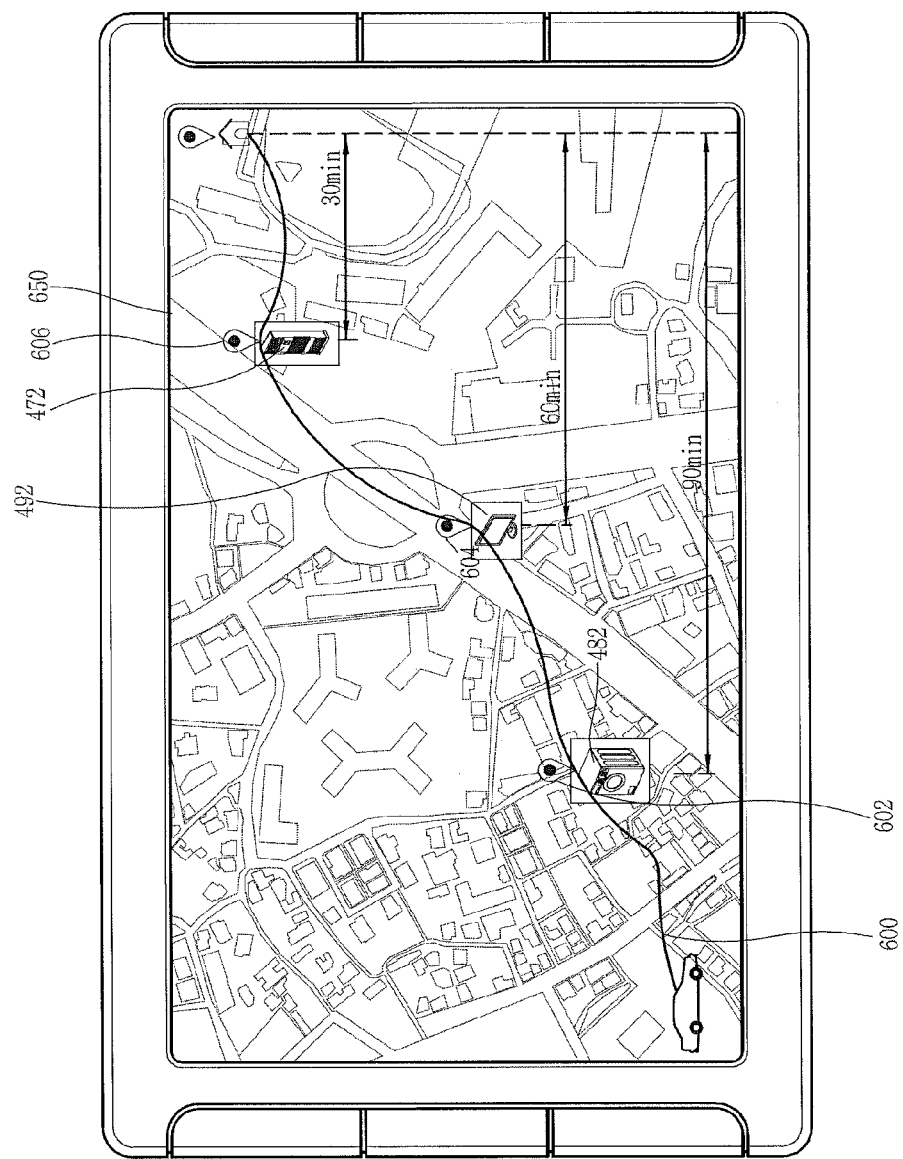
FIG. 6 is a conceptual view illustrating a method by which an electronic device controls at least one home appliance in accordance with one exemplary embodiment of the present invention.

FIG. 5 is a flowchart illustrating a method for controlling an electronic device in accordance with one exemplary embodiment of the present invention, and FIG. 6 is a conceptual view illustrating a method of controlling at least one home appliance in an electronic device in accordance with one exemplary embodiment of the present invention.

First of all, a route corresponding to a preset destination is set in the electronic device (S500). Here, the preset destination is a destination which is preset based on a user selection. Information relating to the destination may be input through the user input unit 130 or input as a user's voice through the microphone 122. In the step S500, an image for indicating the set route may be output in response to a user input. When the destination and the route up to the destination are set, the controller 180 allows the user to set at least one home appliance corresponding to the set destination. For example, the controller 180 may allow the user to set a home appliance list including at least one home appliance. Here, the home appliance list may be one list corresponding to a destination set by a user input, selected from lists pre-stored in the memory 160.

Here, the home appliances may also be set, irrespective of the time point when the destination is decided. For example, the home appliances may be set at anytime even before the destination is set.

The home appliance list may be differently set according to a user-set destination. That is, when the destination is "home," home appliances to be controlled according to the embodiment disclosed herein may include home appliances usually used at home, for example, a washing machine, a microwave oven, a dish washer and the like. On the other hand, when the destination is "office," the home appliances to be controlled may be home appliances associated with office works, for example, a computer, a printer, a copying machine and the like.

Even for the same destination, different home appliance lists may also be set according to user setting. For example, a home appliance list including "air conditioner" may be generated according to the user setting. On the other hand, separate from the list, a home appliance list including "fan" other than "air conditioner" may be generated. The home appliance lists which are differently set according to the destination will be explained later.

The home appliance list may be received in a short-range (or near field) communication manner, such as Bluetooth or IrDA, or received through an external server (for example, a cloud server) or an external device.

Here, the received home appliance list may be a list preset by a user. Or, the received home appliance list may be a list of home appliances, which are preset by home appliance suppliers or companies providing services according to the embodiments disclosed herein.

The controller 180 may exclude (or remove) at least one home appliance corresponding to a user selection from home appliances included in the received home appliance list. Or, the controller 180 may include at least one home appliance corresponding to a user selection to the received home appliance list.

Also, the controller 180 may allow the user to randomly select a home appliance list, separate from the home appliance list decided based on the destination. For example, the controller 180 may receive at least one home appliance list through a short-range communication means based on a user selection. The short-range communication means may be a near field communication (NFC) tag or radio frequency (RF) chip including at least one home appliance list.

Also, the home appliance list may include control time information related to an operation) of each home appliance. Here, the control time information may include at least one of information relating to a time to start an operation of a corresponding home appliance (an operation start time information), information related to a time to end an operation of a currently-operating home appliance (an operation end time information), and control information related to an operating state (an operation control information).

Meanwhile, with regard to the selected home appliance list, the controller 180 decides a point to transmit control signals for controlling the home appliances included in the selected home appliance list, respectively, based on control time information set for each home appliance and an estimated time of arrival at the destination (S504). Here, each point to transmit the control signal may be a point at which the estimated time of arrival at the destination corresponds to a time designated by each control time information.

When the points to transmit the control signals are decided, the controller 180 may output route information including the decided points on the display unit 151 (S506). Here, the route information may include a graphic object for a relevant home appliance on each decided point. Each graphic object may be implemented as at least one of an image, an icon and text corresponding to the relevant home appliance. Also, control time information relating to the corresponding home appliance may be output adjacent to the graphic object.

For example, settings as illustrated in FIG. 6b may be made in case where a destination input by a user is "home" and preset home appliances, as illustrated in FIG. 4, are the washing machine 480, the DVR 490 and the air conditioner 470. A washing machine image 482 relevant to the washing machine 480, a DVR image 492 relevant to the DVR 490 and an air conditioner image 472 relevant to the air conditioner 470 may be output as graphic images on decided control signal transmission points, respectively.

For example, when a destination 650 is set to "home" and the control time information set for each of the washing machine 480, the DVR 490 and the air conditioner 470 is, for example, 90 minutes, 60 minutes and 30 minutes, the time information may be output along with the graphic images. That is, the washing machine image 482, the DVR image 492 and the air conditioner image 472 may be output on the display unit 151 at points where the estimated time of arrival at the destination 650 is 90 minutes, 60 minutes and 30 minutes on a route 600, respectively.

The controller 180 then transmits a control signal to each home appliance (S508). In this instance, the controller 180 checks a current location on the route every preset period of time through the location information module 115 until arriving at the destination 650. The controller 180 then determines whether or not the currently-checked location is a point passing through the control signal transmission point decided at the step S504. When it is determined to pass through the control signal transmission point, the controller 180 transmits the control signal to a relevant home appliance.

Referring to FIG. 6, when it is determined that the current location passes through a control signal transmission point 602, the controller 180 of the electronic device 100 transmits a signal for controlling the washing machine 480 to the destination, for example, "home" 650. Here, the control signal, as illustrated in FIG. 6, may be transmitted from the electronic device 100 directly to "home" 650. Or, the control signal may also be transmitted from the electronic device 100 to "home" 650 through an external wireless relay (not illustrated).

In this instance, the home network server 460 of "home" 650 receives the control signal, and controls a home appliance, namely, the washing machine 480 relevant to the received control signal according to the received control signal. For example, the home network server 460 may turn on the washing machine 480 or turn off the washing machine 480 which is operating according to the control signal.

The electronic device 100 may also transmit the control signal directly to the home appliance, even without the home network server 460. Here, the home appliance which has received the control signal may be directly controlled by the electronic device 100 to be turned on or off.

Here, the electronic device 100, as aforementioned, may also perform the function of the home network server 460 by use of a prestored or preinstalled software or application. In this instance, the controller 180 may transmit the control signal directly to the washing machine 480. That is, the controller 180 may directly control the washing machine 480 by transmitting the control signal directly to the washing machine 480.

Similar to the washing machine 480, control signals for controlling the DVR 490 and the air conditioner 470 may be transmitted, respectively, at control signal transmission points 604 and 606. And, the controller 180 may also directly control the DVR 490 or the air conditioner 470 by transmitting the control signal directly to the DVR 490 or the air conditioner 470. The following description will be given under the assumption that the controller 180 directly controls home appliances.

Meanwhile, each control signal transmitted at each control signal transmission point 602, 604 and 606 may be an operation start control signal for turning on a relevant home appliance, or an operation end control signal for turning off the relevant home appliance.

Also, the control signal may be a signal for changing an operation mode (an operation condition or an operation-related setting) of a currently-operating home appliance. For example, the controller 180 may transmit a control signal for changing an operation mode of the washing machine 480 at least one time according to a user setting.

In this instance, the controller 180 may transmit the operation start control signal for turning on the washing machine 480 to the washing machine 480 at the control signal transmission point 602. The controller 180 may transmit the control signal for changing the operation mode of the washing machine 480 at the control signal transmission point 604. For example, the control signal for changing the operation mode may be a control signal for changing a washing mode of the washing machine 480. Therefore, the washing machine 480 may be turned on 90 minutes before the electronic device 100 arrives at the destination, and the washing mode of the washing machine 480 may change 60 minutes before the electronic device 100 arrives at the destination.

The controller 180 may transmit a control signal for changing the washing mode of the washing machine 480 into a dehydrating mode and designating a time taken for the dehydration (for example, 30 minutes) at the control signal transmission point 606. Accordingly, the washing machine 480 may start the dehydration thirty minutes before the electronic device 100 arrives at the destination and completes the dehydration when the electronic device 100 arrives at the destination. Therefore, the present invention may allow at least one home appliance to be controlled at a precise time desired by a user using vehicle driving information, even without a user's direct control.

Meanwhile, FIG. 6 illustrates that map information 670 is included in a display screen of the electronic device. However, the map information 670 may obscure the gist of the technology disclosed herein. Thus, the map information 670 will be omitted in the following drawings.

Hereinafter, description will be given in detail of an embodiment of setting at least one home appliance list selected by a user, with reference to the accompanying drawings.

Figure 7A:
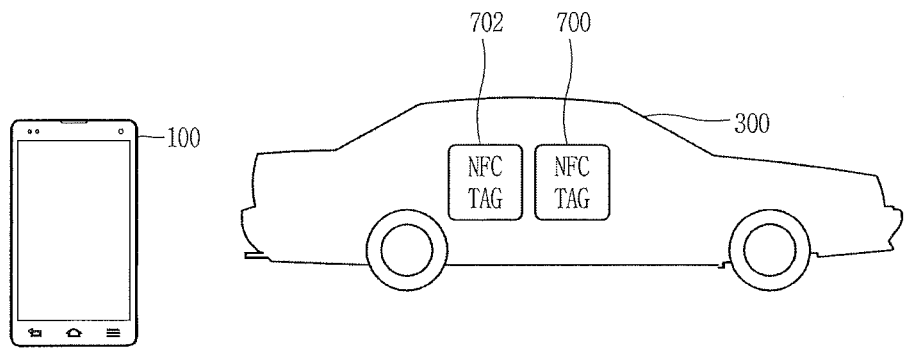
FIGS. 7A and 7B are conceptual views illustrating a method of setting a control for at least one home appliance in an electronic device in accordance with one exemplary embodiment of the present invention.
Figure 7A:
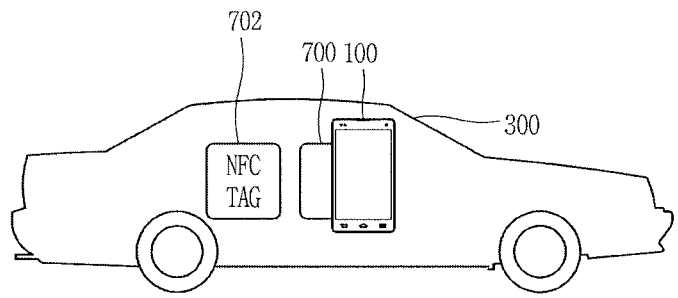
Figure 7A:
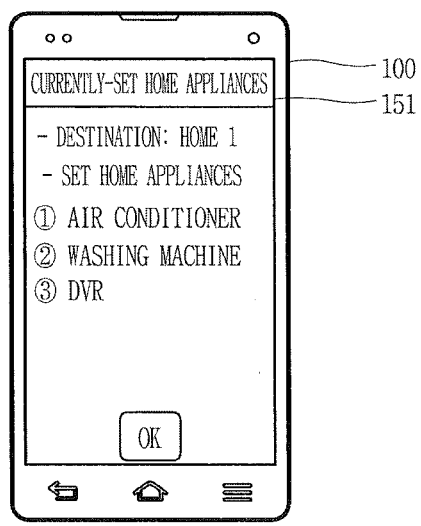
Figure 7B:
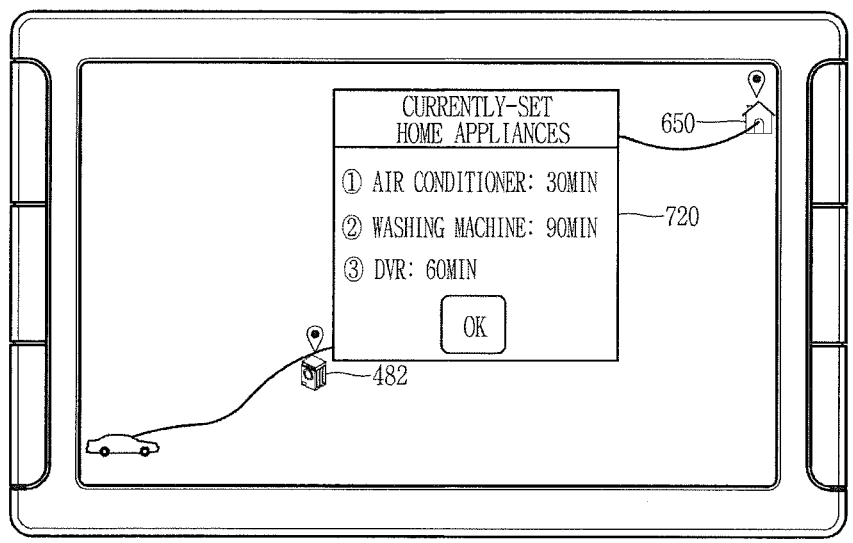
Figure 7B:
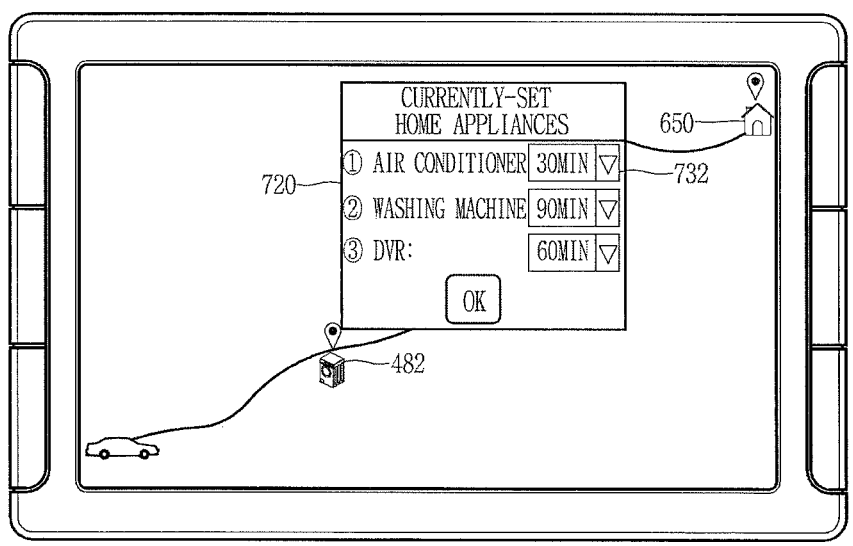

FIGS. 7A and 7B are conceptual views illustrating a method of setting a control for at least one home appliance in an electronic device in accordance with one exemplary embodiment of the present invention.

As aforementioned, the controller 180 may allow the user to set a home appliance list including at least one home appliance in various manners. For example, the controller 180 may receive a home appliance list included in an NFC tag 700 attached to a vehicle through the NFC tag 700.

FIG. 7A illustrates such example. For example, as illustrated in (a) of FIG. 7A, when at least one NFC tag 700, 702 is attached to a vehicle 300, a user may select one of the at least one NFC tag. Here, each NFC tag 700, 702 may store a different home appliance list.

For example, when the electronic device 100 according to the one embodiment is a mobile terminal, the electronic device 100 may receive a home appliance list from one NFC tag selected by the user. That is, as illustrated in (b) of FIG. 7A, the controller 180 may receive the home appliance list from an NFC tag which comes in contact with the electronic device 100 or at least one NFC tag located within a preset distance from the electronic device 100.

Referring to (b) of FIG. 7A, when the home appliance list is received from one NFC tag, the controller 180 may output the received list on the display unit 151. Therefore, the display unit 151 of the electronic device 100 according to the embodiment disclosed herein may output thereon a home appliance list including at least one home appliance to which a control signal is to be transmitted. Also, information related to a place, namely, a destination where each home appliance is installed may be output along with the home appliance list.

(c) of FIG. 7A illustrates such example. Referring to (c) of FIG. 7A, when the NFC tag 700 is selected by the user as illustrated in (b) of FIG. 7A, the controller 180, as illustrated in (c) of FIG. 7A, may receive the home appliance list including the air conditioner 470, the washing machine 480 and the DVR 490 stored in the NFC tag 700, and output the received home appliance list on the display unit 151.

The user can thus check a currently-selected NFC tag and a currently-set home appliance list through such screen information. For example, the controller 180 may output a graphic image (for example, an icon image) for allowing the user to check the currently-set home appliance list. When a user's touch input is applied to a region where the graphic image for allowing the user to check the home appliance list is output, the controller 180 may set home appliances included in the currently-set home appliance list to home appliances to which the control signals are to be transmitted.

For example, when receiving a home appliance list from at least one NFC tag, the controller 180 may also receive only a home appliance list stored in one NFC tag selected by the user.

It has aforementioned that the home appliance list may include control time information related to the operation of each home appliance. Hence, the controller 180 may output the home appliance list on the display unit 151 in a manner of including the control time information related to each of home appliances, which are included in the current list, in the home appliance list. FIG. 7B illustrates such example.

For example, when a home appliance list including the air conditioner 470, the washing machine 480 and the DVR 490 is received, the controller 180 may output the received home appliance list by displaying control time information (30 minutes, 90 minutes and 60 minutes) relating to each home appliance on each corresponding home appliance. The control time information, as illustrated in (a) of FIG. 7B, may be output on one region of the display unit 151 in the form of a list, along with information related to the corresponding home appliance. However, unlike this, the control time information may also be output adjacent to a graphic object corresponding to each home appliance.

The controller 180 may also output screen information for allowing the user to change the control time information relating to at least one home appliance, which is illustrated in (b) of FIG. 7B.

As illustrated in (b) of FIG. 7B, the controller 180 may display a button image 732 for allowing the user to change the control time information relating to the air conditioner 470. When a user's touch input is applied to a region where the button image 732 is displayed, the controller 180 may output a screen for allowing the user to directly input a specific time.

For example, the controller 180 may output a time list including a plurality of preset time (for example, 10 minutes, 20 minutes, and 30 minutes), in response to the user's touch input. When the user selects one of the plurality of preset time, the controller 180 may set the user-selected time to the control time information related to a relevant home appliance.

Or, the controller 180 may output an input screen for allowing a user to directly input a time on one region of the display unit 151. Here, the controller 180 may set the control time information related to a relevant home appliance to the time directly input by the user.

In response to the user selection with respect to the home appliance list, the controller 180 may output a screen for allowing the user to add at least one home appliance to the home appliance list, or a screen for allowing the user to remove at least one home appliance to be controlled from the home appliances included in the home appliance list.

Figure 8A:
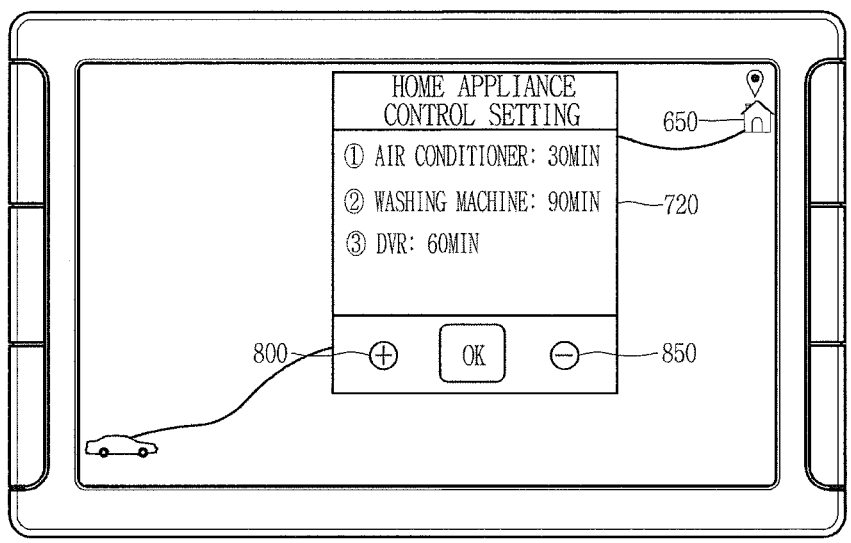
FIGS. 8A and 8B are exemplary views illustrating an example of adding or excluding (removing) home appliances controlled by an electronic device in accordance with one exemplary embodiment of the present invention.
Figure 8A:
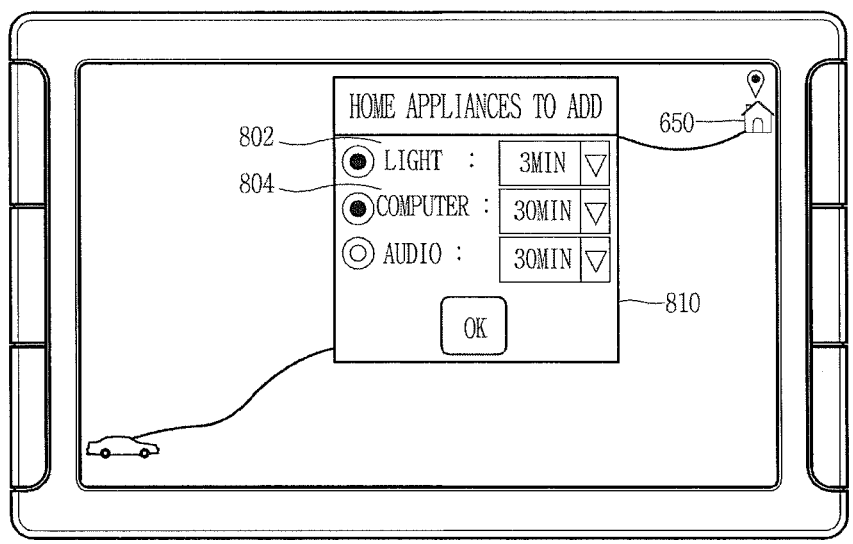
Figure 8B:
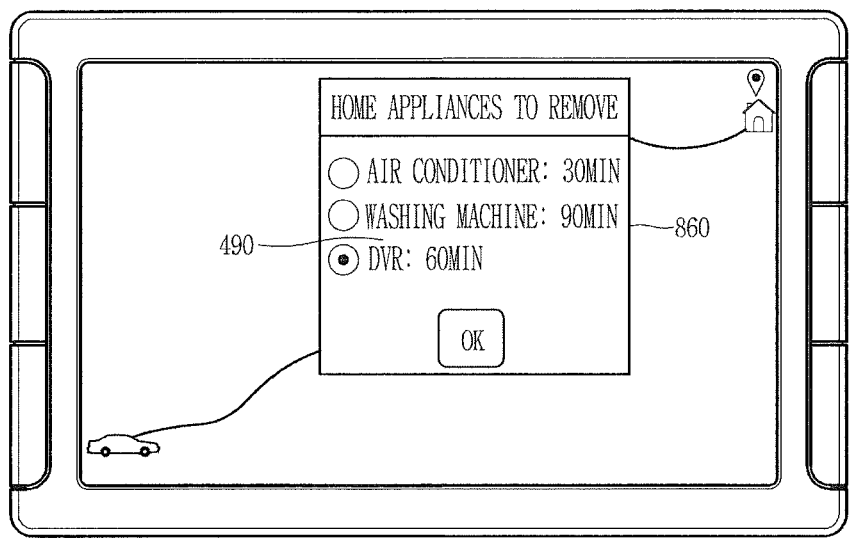
Figure 8B:
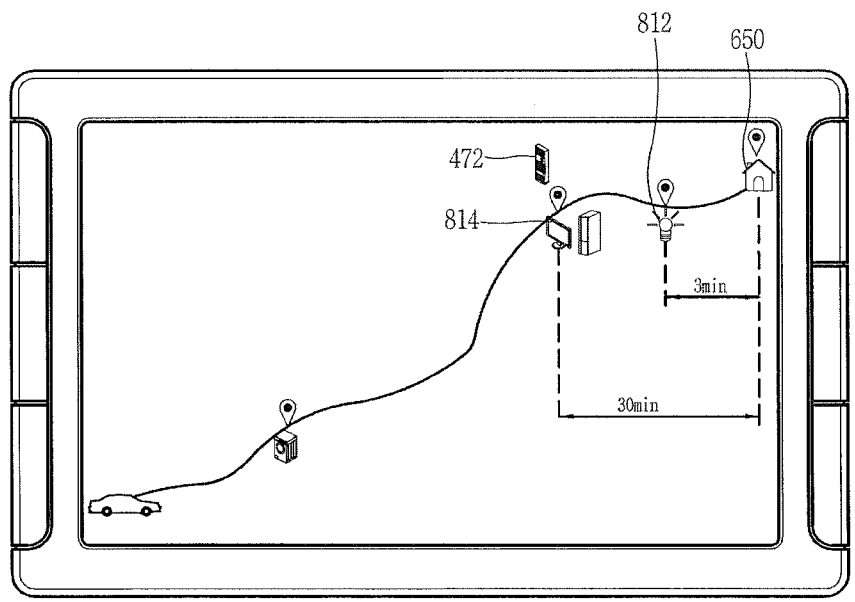

FIGS. 8A and 8B are exemplary views illustrating an example of adding or excluding (removing) home appliances controlled by an electronic device in accordance with one exemplary embodiment of the present invention.

As illustrated in (a) of FIG. 8A, the controller 180 may output a screen including an add button image 800 or a remove button image 850, in response to a user selection with respect to one home appliance list.

Here, the controller 180 may control the sensing unit 140 to sense a user's touch input for adding at least one home appliance to a currently-set home appliance list or remove at least one of home appliances included in the currently-set home appliance list. For example, when the user's touch input is applied to a region where the add button image 800 is output, the controller 180 may recognize that an addition for at least one home appliance to the currently-set home appliance list has been selected.

In this instance, the controller 180 may output a screen for allowing the user to add at least one home appliance on one region of the display unit 151, which is illustrated in (b) of FIG. 8A.

As illustrated in (b) of FIG. 8A, the controller 180 may output a screen including home appliance items to add to a currently-set home appliance list. As illustrated in (b) of FIG. 8A, when at least one home appliance (light: 802, computer: 804) is selected by the user, the user-selected at least one home appliance can be added to the currently-set home appliance list.

In this instance, the controller 180 may decide a point to transmit a control signal to the added home appliance, on the basis of control time information relevant to the added home appliance and an estimated time of arrival at a destination. The controller 180 may display route information with a graphic object, which corresponds to the user-added home appliance, on the decided control signal transmission point.

(b) of FIG. 8A illustrates such example. For example, as illustrated in (b) of FIG. 8A, the light 802 and the computer 804 may be added by the user to the home appliance list. In this instance, the controller 180 may decide a point, at which the estimated time of arrival at the destination, for example, "home" 650 corresponds to 30 minutes designated by control time information relevant to the computer 804, as a point to transmit a control signal to the computer 804. In this manner, the controller 180 may decide a control signal transmission point corresponding to 3 minutes designated by control time information relevant to the light 802.

Also, when the control signal transmission points are decided, the controller 180 may output graphic objects corresponding to the added home appliances, respectively, on the decided points. Accordingly, as illustrated in (b) of FIG. 8B, a light image 812 and a computer image 814 may be output on the display unit 151 along with the respective control signal transmission points.

Meanwhile, when a user's touch input is applied to a region with the remove button image 850 output thereon, the controller 180 may recognize that the user has selected a removal of at least one of home appliances included in a currently-set home appliance list.

In this instance, the controller 180 may output a screen, which allows the user to select at least one home appliance to remove, on one region of the display unit 151, which is illustrated in (a) of FIG. 8B.

As illustrated in (a) of FIG. 8B, the controller 180 may output a screen for selecting at least one of items of home appliances included in a currently-set home appliance list. Referring to (a) of FIG. 8B, when the user selects one home appliance item, the controller 180 may remove (exclude) a home appliance corresponding to the user-selected item, from the currently-set home appliance list.

Here, the controller 180 may not transmit a control signal with respect to the removed home appliance. Accordingly, route information output on the display unit 151 may not include information related to the removed home appliance. Therefore, as illustrated in (a) of FIG. 8B, when the DVR 490 is removed from the home appliance list by the user's selection, the DVR image 492 which has been illustrated in FIG. 6 may not be output on the screen any more, as illustrated in (b) of FIG. 8B.

The foregoing description has been given in detail of the method of setting a home appliance list including at least one home appliance, to which a control signal is to be transmitted, according to a user-set destination or a user selection.

Hereinafter, description will be given in detail of a method in which the electronic device receives updated traffic information and accordingly changes a point to transmit a control signal according to the received traffic information.

In general, the navigation unit 183 calculates a route up to a user-input destination, and an estimated time of arrival at the destination when the user moves along the route. However, the estimated time of arrival at the destination may change ever so many according to a traffic condition which varies in real time.

Therefore, the electronic device 100 according to the embodiment disclosed herein may be allowed to receive updated traffic information from at least one external server through the wireless communication unit 110, and utilize the received traffic information to transmit a control signal according to an embodiment of the present invention. That is, when an extra time is required to get to the destination due to traffic jam, the electronic device 100 according to the embodiment disclosed herein may modify (recalculate) the estimated time of arrival at the destination, and change a point, which has been decided as a control signal transmission point, on the basis of the modified estimated time of arrival.

Figure 9A:
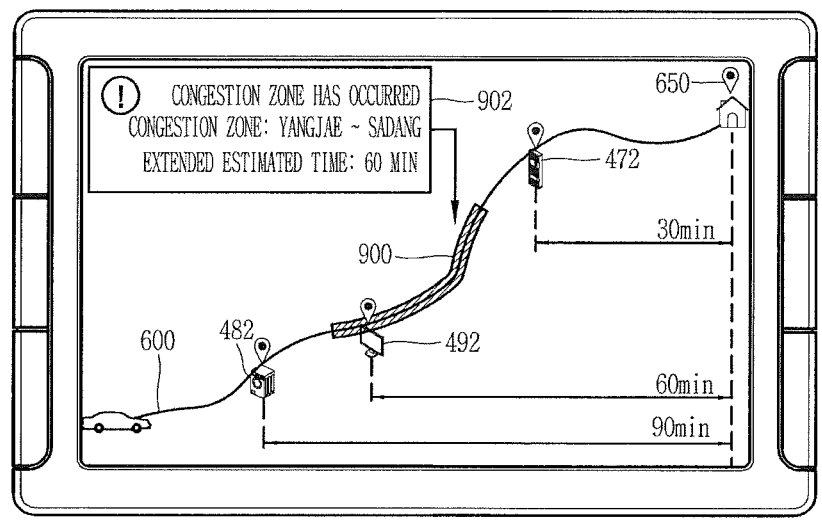
FIGS. 9A and 9B are conceptual views illustrating a method of changing (varying) a point to transmit a control signal according to updated traffic information in an electronic device in accordance with one exemplary embodiment of the present invention.
Figure 9A:
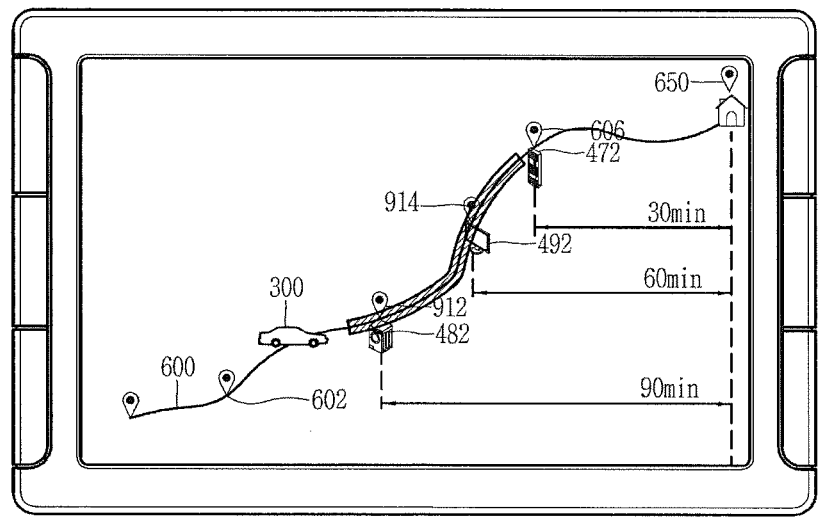
Figure 9A:
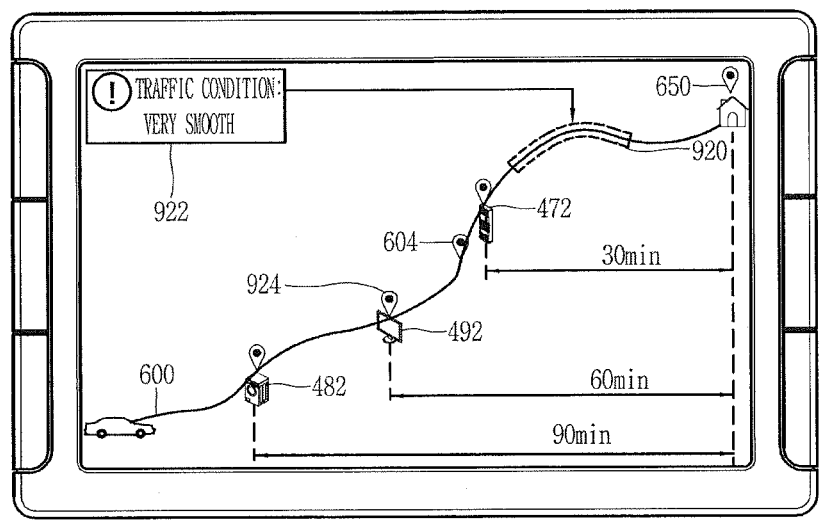
Figure 9B:
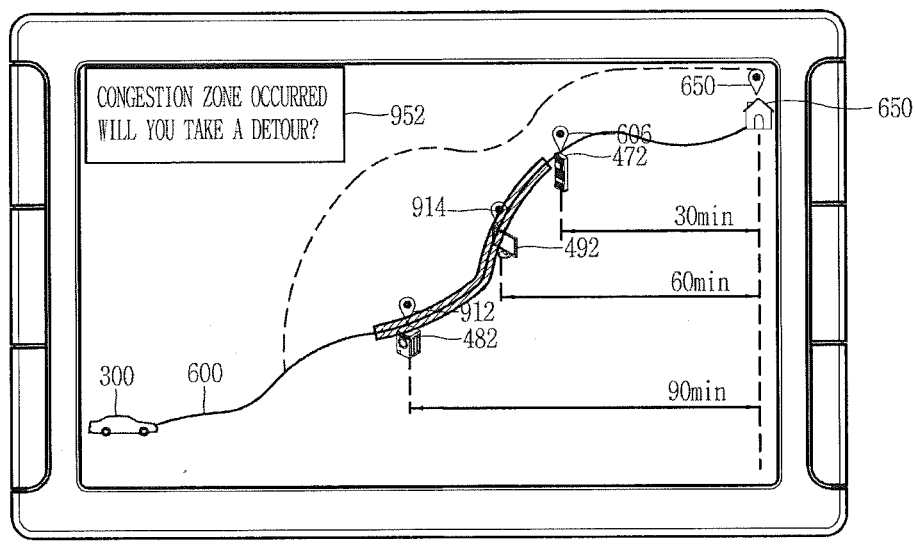
Figure 9B:
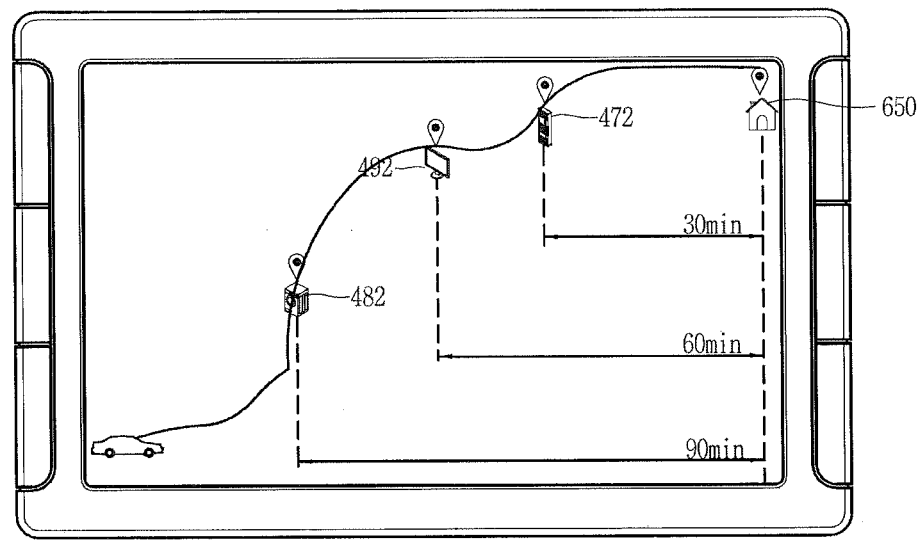

FIGS. 9A and 9B are conceptual views illustrating a method of changing a point to transmit a control signal thereto according to updated traffic information in an electronic device in accordance with one exemplary embodiment of the present invention.

For example, when updated traffic information is received, the controller 180 may output screen information including the received traffic information on one region of the display unit 151. The controller 180 may then output a traffic condition based on the received traffic information on a route 600.

(a) of FIG. 9A illustrates such example. When a traffic congestion zone occurs at a distance from a point, for example, "Yangjae," which is one point, one stop-by or one destination, to a point, for example, "Sadang," which is one point, one stop-by or one destination, the controller 180, as illustrated in (a) of FIG. 9A, may indicate a congestion zone 900 along the corresponding distance, such that the congestion zone 900 can be output on the display unit 151 along with the received traffic information 902.

In this instance, the controller 180 may decide a point at which a control signal is to be transmitted, by considering a delayed time due to the congestion zone 900. That is, the controller 180 calculates the estimated time of arrival at the destination, for example, "home" 650 by reflecting an estimated extra required time to arrive at the destination. And, the controller 180 may change at least one control signal transmission point according to the calculated result.

As illustrated in (a) of FIG. 9A, when a 60-minute extra time is required due to the congestion zone 900, for example, the controller 180 may calculate the estimated time of arrival at the destination by adding the extra time to the previously-calculated estimated time of arrival at the destination. The controller 180 may then change predecided control signal transmission points according to the calculated result.

That is, if it is assumed that the estimated time of arrival at the destination which has been calculated prior to receiving traffic information is a first time (for example, 120 minutes), the controller 180 may transmit a control signal to the DVR 490, for which a time designated based on the control time information is a second time (for example, 60 minutes) as illustrated in FIG. 6, at a point 604 that the estimated time of arrival at the destination corresponds to the second time (for example, 60 minutes), namely, a point corresponding to a middle point of the route (60/120 from the destination=1/2 point).

However, when a 60-minute extra time is generated due to the congestion zone 900, the controller 180 can calculate the estimated time of arrival at the destination as a time, namely, 180 minutes, by adding the extra time. Here, the controller 180 decides a point, at which the estimated time of arrival at the destination corresponds to 60 minutes on the route with 180 minutes of the estimated time of arrival, as a point to transmit the control signal to the DVR 490. Therefore, the point to transmit the control signal to the DVR 490 may be changed to a point closer to the destination, for example, "home" 650 (60/180 from the destination=1/3 point) than before the congestion zone 900 is generated.

In addition, the controller 180 may selectively change only control signal transmission points which are subject to the congestion zone. For example, for a control signal transmission point located on the route to the destination after the congestion zone 900, the controller 180 may determine that the control signal transmission point is not affected by the congestion zone 900.

(b) of FIG. 9A illustrates such example. As illustrated in (b) of FIG. 9A, it can be seen that the point 606 to transmit the control signal to the air conditioner 470 is located on the route to the destination after the congestion zone 900. Hence, the controller 180 may determine that the control signal transmission point 606 is not affected by the congestion zone 900. Accordingly, as illustrated in (b) of FIG. 9A, the controller 180 may not change the control signal transmission point 606.

However, as illustrated in (b) of FIG. 9A, since the control signal transmission point 604 for the DVR 490 belongs to the congestion zone 900, the controller 180 may determine that the control signal transmission point 604 is subject to the congestion zone 900. Therefore, the controller 180 may change the control signal transmission point 604 into a control signal transmission point 914, which is decided by reflecting the extra time estimated due to the congestion zone 900. The controller 180 may then output the DVR image 492, which is the graphic object corresponding to the DVR 490, at the changed point.

Meanwhile, even when having already transmitted a control signal, the controller 180 may retransmit the control signal by reflecting the extra time generated due to the congestion zone 900. For example, as illustrated in (b) of FIG. 9A, when the vehicle 300 has passed through the control signal transmission point 602, the controller 180 transmits a control signal to the washing machine 480. Upon reception of the control signal, the operation of the washing machine 480 may be controlled according to the received control signal.

However, as illustrated in (b) of FIG. 9A, even for a control signal transmission point through which the vehicle 300 has passed and at which the control signal has been transmitted, when the control signal transmission point is affected due to the congestion zone 900, its location may be changed. That is, for the washing machine 480 for which a time designated by the control time information is 90 minutes, a point at which the estimated time of arrival at the destination corresponds to 90 minutes due to the congestion zone 900 may be a point 912 which the vehicle 300 has not passed through yet.

In this instance, the controller 180 may transmit a control signal for canceling a previous control signal to the washing machine 480. For example, when the controller 180 has transmitted the operation start control signal at the control signal transmission point 602, the controller 180 may cancel the signal, namely, transmit an operation end control signal.

The controller 180 may change the control signal transmission point 602 into the control signal transmission point 912 by reflecting an extra time estimated due to the congestion zone 900. The controller 180 may thus display the washing machine image 482, which is the graphic object corresponding to the washing machine 480, at the changed point.

Also, the foregoing description has been given of deciding a new control signal transmission point, instead of a control signal transmission point at which the control signal has already been transmitted as the vehicle has passed therethrough, but the decision may also be made according to a user selection. That is, the controller 180 may not reflect the affection due to the congestion zone or the like to a home appliance, to which a control signal has already been transmitted, according to a user selection.

In the meantime, the controller 180 of the electronic device 100 according to the embodiment disclosed herein may also take into account a case of a very good traffic condition as well as the traffic jam. For example, as illustrated in (c) of FIG. 9A, when the estimated time of arrival at the destination is likely to be reduced in response to a generation 922 of a good traffic condition zone 920, the controller 180 may change the control signal transmission points by reflecting the reduction of the estimated time of arrival. For example, when the estimated time of arrival at the destination is reduced by 30 minutes, the controller 180 may calculate the estimated time of arrival at the destination by reflecting the reduction (120 min−30 min=90 min).

The controller 180 may change a control signal transmission point according to the calculated result. For example, with respect to the DVR 490 for which a time designated based on the control time information is 60 minutes, the controller 180 may change the control signal transmission point 604 for the DVR 490 into a point at which the estimated time of arrival at the destination is 60 minutes, namely, into a point 924 farther away from the destination (60/90 point=2/3 point). The controller 180 may thus display the DVR image 492, which is the graphic object corresponding to the DVR 490, at the changed point.

The received traffic information may also include information related to a detour which allows the vehicle 300 to avoid the congestion zone 900. When receiving traffic information including detour information, as illustrated in (a) of FIG. 9B, the controller 180 may output a detour 950, and screen information 952 for selecting the detour 950.

Here, the controller 180 may change control signal transmission points for the home appliances 470, 480 and 490 to points on the detour according to a user selection. That is, when a location of the vehicle 300 is detected on the detour 950, the controller 180 may recognize that the detour 950 has been selected by the user. Or, the controller 180 may sense a user input applied through the screen 952 for selecting the detour 950 and thus recognize the selection of the detour 950.

In this instance, the controller 180 calculates an estimated time of arrival at the destination, for example, "home" 650 on the detour 950. The controller 180 then decides new points to transmit the control signals corresponding to the home appliances 470, 480 and 490, respectively, on the basis of the calculated estimated time of arrival. Here, the controller 180 may decide points 960, 962 and 964 on the detour 950, at which the estimated time of arrival at the destination corresponds to each time designated based on respective control time information relevant to the home appliances 470, 480 and 490, as the new control signal transmission points. Therefore, the points to transmit the control signals to the respective home appliances 470, 480 and 490 may be changed into the points located along the detour 950. The controller 180 may output the graphic objects 482, 492 and 472, which have been output on the previous route 600, on the points 960, 962 and 964 on the detour 950. Therefore, in the electronic device 100 according to the embodiment disclosed herein, a screen with changed control signal transmission points thereon may be displayed on the display unit 151, in response to the selection of the detour.

The following description has been given in detail of the method of receiving traffic information to adapt to a frequently-changed traffic condition, and changing control signal transmission points according to the received traffic information.

However, it may also be possible that the control signal transmission points can be changed by a user's direct input as well as the external environmental factor such as the traffic information. Hereinafter, description will be given in detail of a method of changing a point to transmit a control signal to a home appliance in response to a user's input, with reference to the accompanying drawings.

Figure 10A:
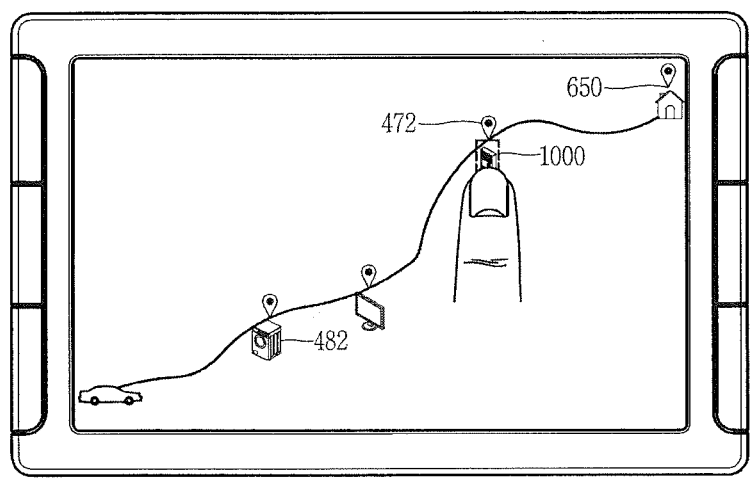
FIGS. 10A and 10B are conceptual views illustrating a method of changing a point to transmit a control signal according to a user touch input in an electronic device in accordance with one exemplary embodiment of the present invention.
Figure 10A:
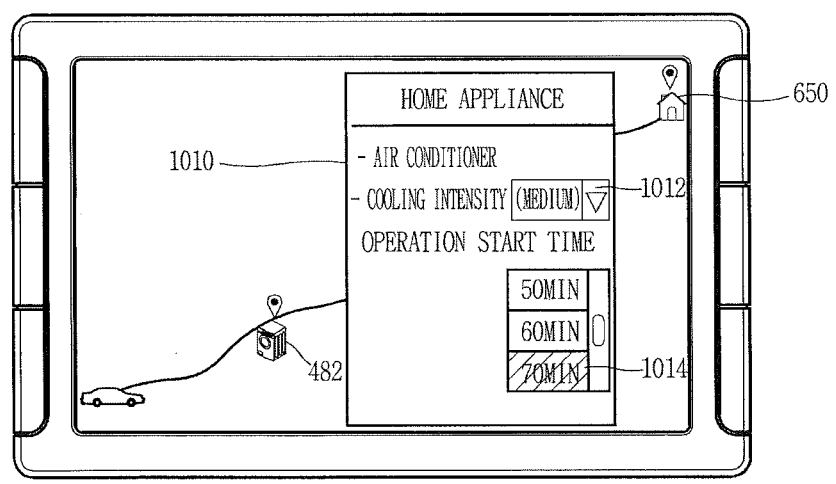
Figure 10A:
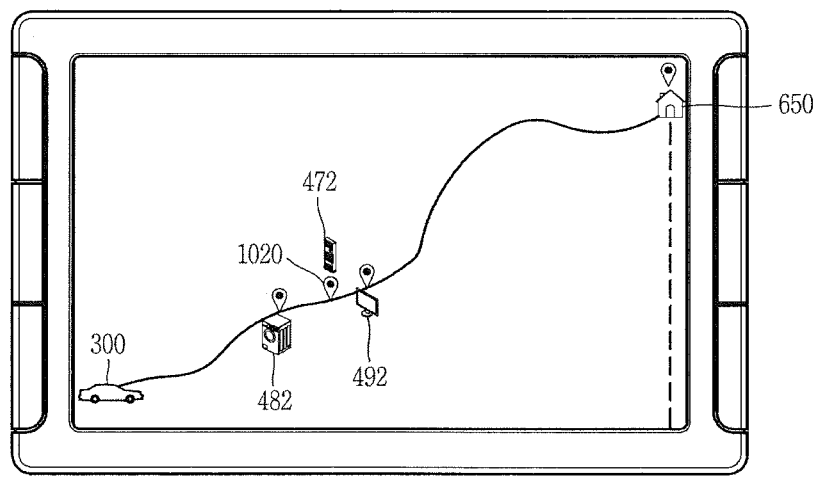
Figure 10B:
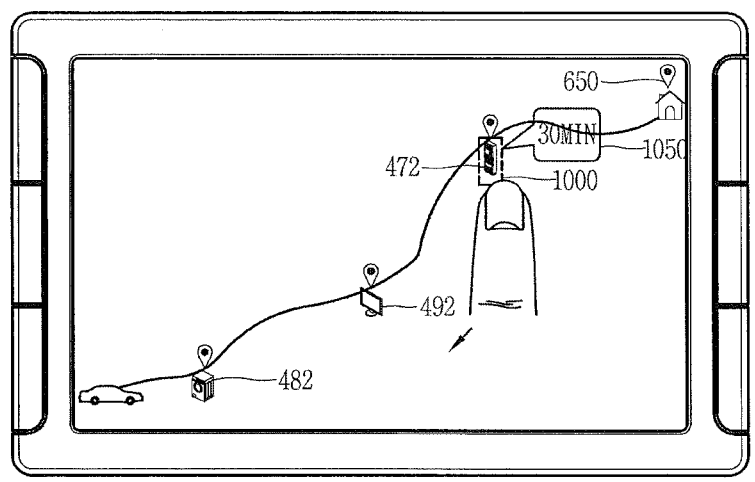
Figure 10B:
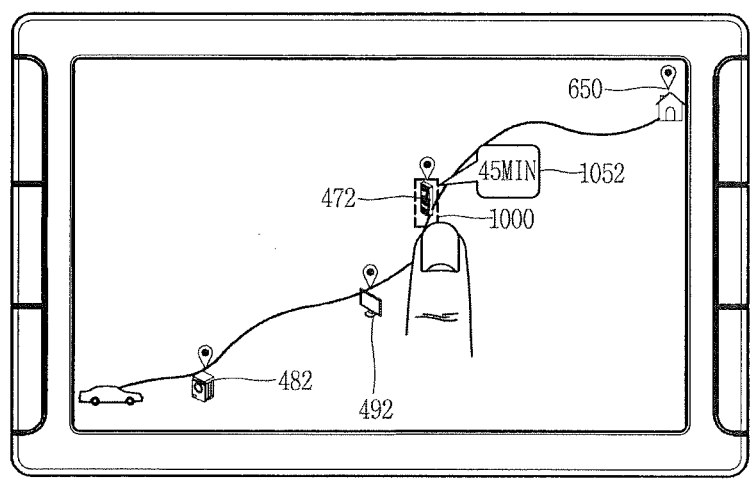
Figure 10B:
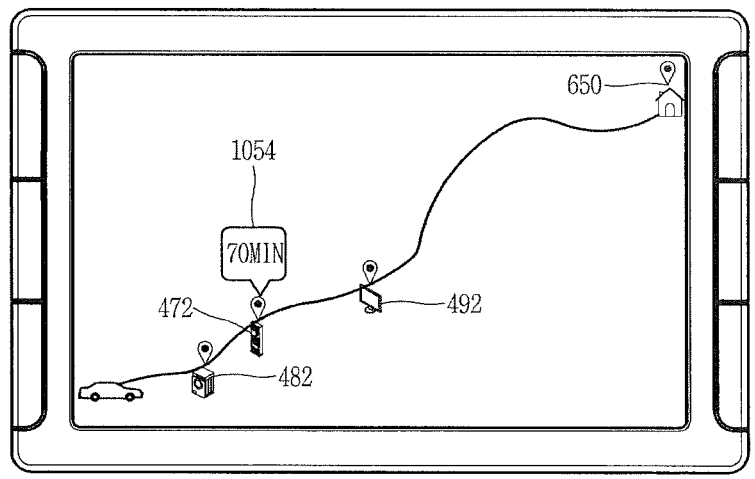

FIGS. 10A and 10B are conceptual views illustrating a method of changing a point to transmit a control signal according to a user touch input in an electronic device in accordance with one exemplary embodiment of the present invention.

In an electronic device according to one embodiment disclosed herein, it is possible to change a setting for controlling (i.e., a control setting for) at least one home appliance in response to a user input. Here, the control setting refers to a setting for controlling a home appliance relevant to a user input to be turned on or a setting for controlling a currently-operating home appliance to be turned off. Here, the control setting may include control time information. The control time information refers to information which includes operation start time information or operation end time information for starting or ending an operation of at least one home appliance after a specific time. Also, the control setting may be a setting for changing an operating state of a currently-operating home appliance.

For example, when a home appliance is "air conditioner," the control setting may be relevant to turning on the "air conditioner" or turning off the currently-operating "air conditioner." Here, the control setting may include information related to a specific time for turning on the "air conditioner" or information related to a specific time for turning off the currently-operating "air conditioner." The control setting may also be a setting for changing the operating state of the "air conditioner," for example, "cooling intensity."

To this end, the electronic device according to the embodiment disclosed herein may allow a user to select one home appliance through a screen including at least one graphic object corresponding to different home appliances. For example, when a user's touch input is applied to a region on which one of the at least one graphic object is output, the controller 180 may recognize that a home appliance corresponding to the one graphic object has been selected.

(a) of FIG. 10A illustrates such example. (a) of FIG. 10A illustrates a case where a user touch input is sensed on a region on which the air conditioner image 472 of the graphic objects 482, 492, and 472 is displayed on the display unit 151.

In this instance, the controller 180 may highlight the graphic object 472 corresponding to the user touch input. For example, the controller 180 may discriminately output the region with the graphic object 472 corresponding to the user touch input in a flickering manner, or in a different color from the other graphic objects 482 and 492. Or, the controller 180 may output a guide image 1000 for guiding the graphic object 472.

In such a manner, in response to a user's touch input to one graphic object, the controller 180 may output a setting information screen including a control setting for a corresponding home appliance on the display unit 151, which is illustrated in (b) of FIG. 10A.

As illustrated in (b) of FIG. 10A, the setting information screen may include at least one information relating to a control setting for a relevant home appliance. That is, the setting information screen may include information related to an operating state of a specific home appliance or an operation start time for turning on the specific home appliance. Here, when a time set on the control setting screen is expired, the specific home appliance may start to operate in an operating state included in the setting information at a time point that the operation start time is expired.

That is, referring to (b) of FIG. 10A, for example, the air conditioner 470 of "home" 650 may start to operate in a state of being set to "medium" for cooling intensity after a lapse of a time set by the user. Similar to the operation start time, the setting information screen may also include information relating to an operation end time for turning off the specific home appliance.

Meanwhile, as illustrated in (b) of FIG. 10A, the controller 180 may display a screen 1012 for allowing the user to change the operating state of the specific home appliance. Also, the controller 180 may allow the user to change control time information relevant to the specific home appliance. For example, as illustrated in (b) of FIG. 10A, the controller 180 may output screen information 1014 for allowing the user to change control time information relevant to the specific home appliance. The controller 180 may then change the control time information relevant to the home appliance in response to a user input through the output screen information.

However, in this instance, when the user changes the control time information, a point to transmit a control signal to the home appliance may be changed. That is, the controller 180 may change the point to transmit the control signal to the home appliance into a point at which the estimated time of arrival at the destination corresponds to a time designated based on the changed control time information on the currently-set route, which is illustrated in (c) of FIG. 10A.

As illustrated in (c) of FIG. 10A, when a user's touch input is applied to a region where the air conditioner image 472 is output, the controller 180 may output a screen illustrated in (b) of FIG. 10A on the display unit 151 in response to the user's touch input.

In this instance, the controller 180 may change a control setting for the home appliance, namely, the air conditioner 470 corresponding to the air conditioner image 472 in response to the user's touch input. That is, as illustrated in (b) of FIG. 10A, the controller 180 may change the control setting in a manner that the air conditioner 470 can operate after "70 minutes" in a state that cooling intensity thereof is set to "medium," in response to the user's touch input.

Here, as illustrated in (c) of FIG. 10A, the controller 180 may change a point to transmit a control signal to the air conditioner 470 into a point 1020, at which the estimated time of arrival at the destination, for example, "home" 650 corresponds to a 70-minute operation start time set by the user. Accordingly, the controller 180 may transmit the control signal for operating the air conditioner 470 with the cooling intensity set to "medium" when the vehicle 300 passes through the changed control signal transmission point 1020.

The electronic device according to the embodiment disclosed herein may also allow a control signal transmission point for at least one home appliance to be changed in response to a user's touch & drag input.

FIG. 10B illustrates such example. (a) of FIG. 10B illustrates a case where a user's touch input is sensed on a region on which the air conditioner image 472 of the graphic objects 482, 492 and 472 is displayed on the display unit 151.

Here, the controller 180 may highlight the graphic object 472 corresponding to the user's touch input. For example, the controller 180 may output the region with the graphic object 472 corresponding to the user's touch input in a flickering manner, in a different color, or by outputting a guide image 1000.

In such a manner, in response to a user's touch input applied to one graphic object, currently-set control time information for a relevant home appliance can be displayed. For example, when a user's touch input is applied to the region with the air conditioner image 472, as illustrated in (a) of FIG. 10B, the controller 180 may output the currently-set control time information for the air conditioner 470, namely, "30 minutes" of operation start time information in the vicinity of the air conditioner image 472.

Also, while the user's touch input is sensed, when a user's drag input is applied, the controller 180 may move a graphic object corresponding to the user's touch input to a location where the user's drag input is applied, which is illustrated in (b) of FIG. 10B.

As illustrated in (b) of FIG. 10B, when a user's touch input is applied to a region where the air conditioner image 472 is displayed, the controller 180 may sense whether or not a user's drag input is applied. When the user's drag input is applied, the controller 180 may move the air conditioner image 470 to a location corresponding to the drag input. Here, the controller 180 may display an estimated time of arrival, which is from the location moved thereto by the drag input to the destination of the currently-set route, in the vicinity of the air conditioner image 472. For example, as illustrated in (b) of FIG. 10B, the controller 180 may display the estimated time of arrival, namely, "45 minutes" from the location corresponding to the user's drag input to the destination, for example, "home" 650 in the vicinity of the graphic object, namely, the air conditioner image 472 corresponding to the air conditioner 470.

The controller 180 may also set the estimated time of arrival from the location corresponding to the user's drag input to the destination to control time information relevant to the home appliance corresponding to the user's touch input.

That is, for example, as illustrated in (c) of FIG. 10B, the controller 180 may move one graphic object to a location corresponding to the user's drag input. The controller 180 may then set an estimated time of arrival from the moved location to the destination to the control time information related to the home appliance corresponding to the moved graphic object. Therefore, as illustrated in (c) of FIG. 10B, the control signal transmission point of the air conditioner 470 for which the operation start time has been set to "30 minutes" may be changed to a point at which the estimated time of arrival at the destination is "70 minutes" left, in response to the user's touch & drag input.

Therefore, in the electronic device according to the embodiment disclosed herein, an operation of at least one home appliance can be controlled on the basis of an estimated time of arrival at a destination, even without a use's direct control, and a control setting for each home appliance can be individually changed. Consequently, the electronic device may allow a home appliance corresponding to a user selection to be automatically controlled at a precise time that the user desires.

The electronic device according to the embodiment disclosed herein may also feedback information, which is related to a home appliance to which a control signal has been transmitted or a home appliance to which a control signal is to be transmitted, to a user. For example, the electronic device according to the embodiment disclosed herein may output screen information including the feedback information on one region of the display unit 151, in response to a user input.

Figure 11A:
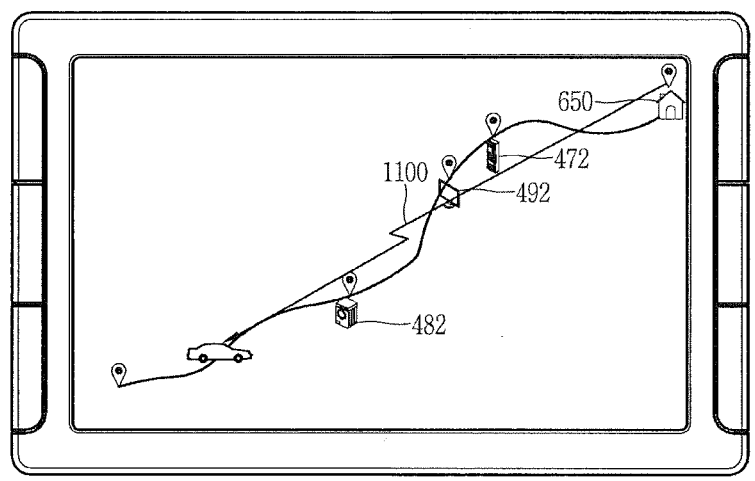
FIG. 11 is a conceptual view illustrating a method of receiving and outputting feedback information in an electronic device in accordance with one exemplary embodiment of the present invention.
Figure 11B:
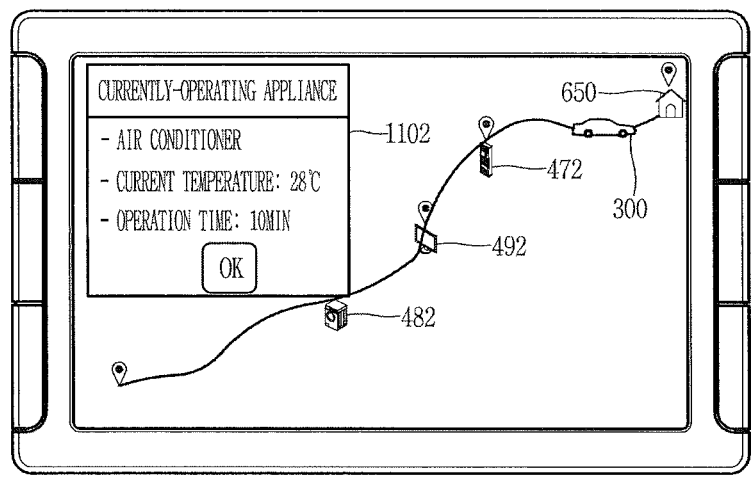
Figure 11C:
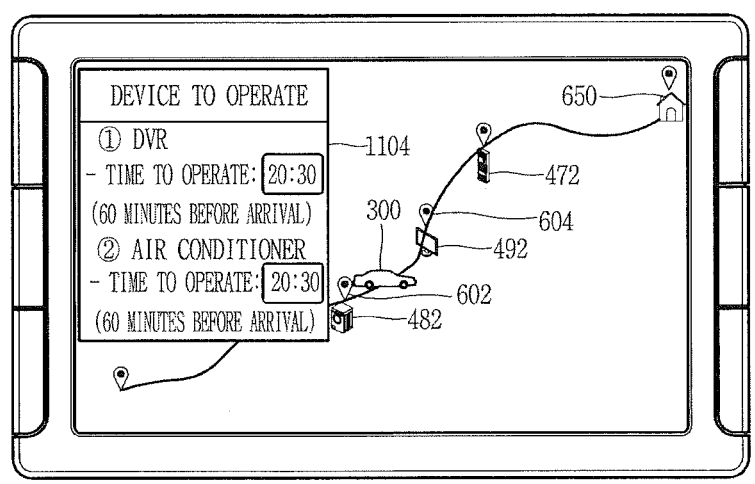

FIG. 11 is a conceptual view illustrating a method of receiving and displaying feedback information in an electronic device in accordance with one exemplary embodiment of the present invention.

As illustrated in (a) of FIG. 11, the electronic device according to the embodiment disclosed herein may receive the feedback information from a destination. For example, the electronic device 100 may receive feedback information related to each home appliance from the home network server 460 of the destination. Or, as aforementioned, when the electronic device also plays a role of the home network server 460, the controller 180 may receive the feedback information directly from each of at least one home appliance.

Here, the controller 180 may also directly receive the feedback information even though the electronic device does not serve as the home network server 460.

The feedback information may include information related to a currently-operating home appliance. (b) of FIG. 11 illustrates an example of receiving the information related to the currently-operating home appliance as the feedback information.

Referring to (a) of FIG. 11, the controller 180 may output feedback information, which is received from the destination, for example, "home" 650 on one region of the display unit 151. The received feedback information may include information related to a home appliance to which a control signal has already been transmitted. Accordingly, as illustrated in (b) of FIG. 11, information related to at least one home appliance whose operation has been controlled in response to a control signal transmitted thereto may be output on the display unit 151.

The feedback information may include information related to an operating state of the currently-controlled home appliance, and a current environment of the destination (for example, temperature of the destination), or an elapsed time after the control based on the control signal is executed.

In addition, the feedback information may include information related to a home appliance to which a control signal is expected to be transmitted. (c) of FIG. 11 illustrates an example of receiving, as feedback information, information related to at least one home appliance to which a control signal is to be transmitted.

As illustrated in (c) of FIG. 11, the controller 180 may output feedback information received from the destination, for example, "home" 650 on one region of the display unit 151. The received feedback information may include information related to at least one home appliance to which a control signal is to be transmitted. Accordingly, as illustrated in (c) of FIG. 11, when the vehicle 300 is located between the point 602 to transmit the control signal to the washing machine 480 and the point 604 to transmit the control signal to the DVR 490, information related to the DVR 490 and the air conditioner 470 may be output on the display unit 151.

In this instance, the feedback information may include currently-set control setting information related to each home appliance, namely, control time information relevant to an operation start time or an operation end time, and setting information related to an operating state.

The foregoing description has been given of the method of receiving feedback information from at least one home appliance which has been controlled based on a transmitted control signal or at least one home appliance to which a control signal is to be transmitted, and outputting the received feedback information on the display unit 151.

As described above, in the electronic device according to the embodiment disclosed herein, a home appliance list may be decided based on a user-input destination or may be received from a preset external server or an external device such as an NFC tag. Here, the home appliance list may be preset to include at least one home appliance according to a destination or a user selection even for the same destination. Also, at least one place including at least one home appliance may be preset by a user.

Figure 12A:
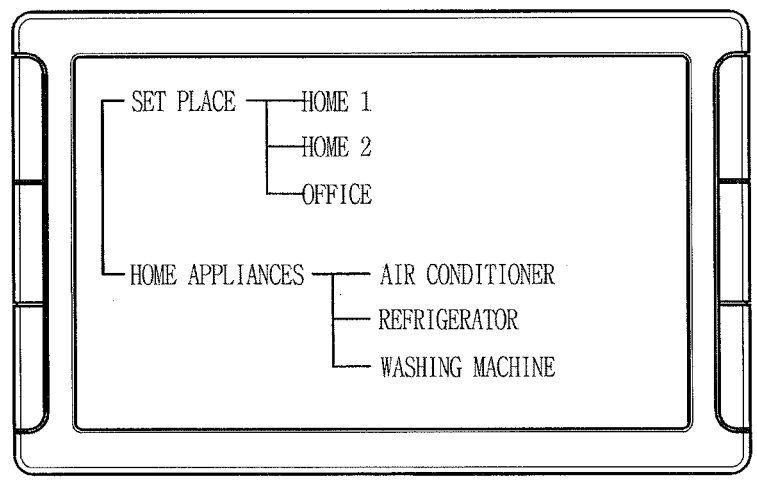
FIG. 12 is a conceptual view illustrating a method of setting a control for different home appliances according to various set places in an electronic device in accordance with one exemplary embodiment of the present invention.
Figure 12B:
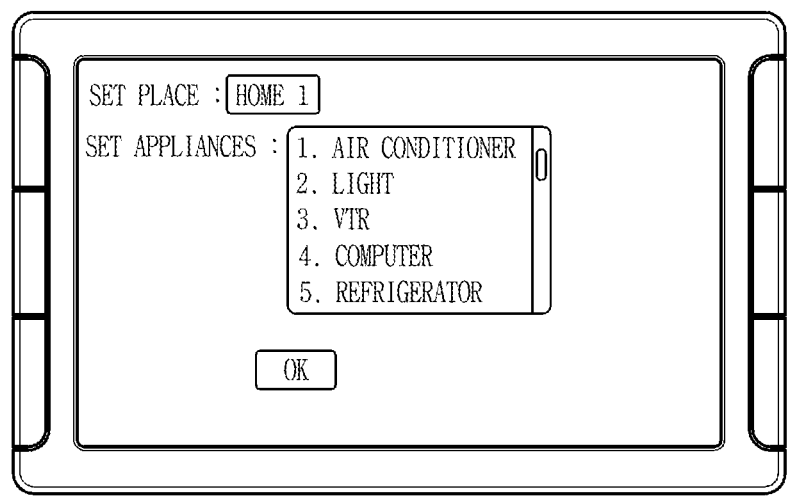
Figure 12C:
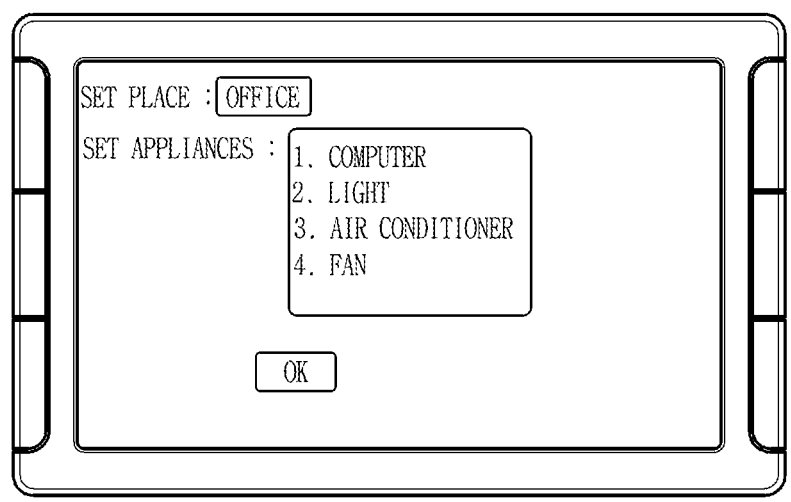

FIG. 12 is a conceptual view illustrating a method of setting controls for different home appliances according to various set places in accordance with one exemplary embodiment of the present invention.

As illustrated in FIG. 12, the controller 180 may output a screen, which includes information related to at least one set place and information related to a plurality of home appliances, which are currently stored, on the display unit 151 in response to a user input.

(a) of FIG. 12 illustrates such example. That is, the controller 180 may output on the display unit 151 information relating to various set places selectable by the user and at least one home appliance in the form of a tree, in response to a user input.

While such screen information is output, the controller 180 may sense a user input through the sensing unit 140. For example, the controller 180 may sense presence or absence of a user's touch input applied to a region with one set place displayed on the screen output in (a) of FIG. 12. The controller 180 may then output a home appliance list, which is currently set for the set place corresponding to the user's touch input on the screen.

(b) and (c) of FIG. 12 illustrate such example. It is assumed in (b) and (c) of FIG. 12 that set places "home 1" and "home 2" correspond to the same destination, for example, "home" 650.

For example, when a user's touch input is applied to a region with the set place "home 1" displayed thereon, the controller 180, as illustrated in (b) of FIG. 12, may display a list of home appliances corresponding to the set place "home 1." When the user's touch input is sensed on a region with the set place "home 2" displayed thereon, the controller 180 may display a list of home appliances corresponding to the set place "home 2."

In the meantime, as illustrated in (b) and (c) of FIG. 12, even for the same destination, for example, "home" 650, home appliance lists including different home appliance items may be provided. That is, the controller 180 may set a home appliance list including different home appliance items for various circumstances according to a user selection even when the same destination has been set.

The set places including different home appliance items even for the same destination, as illustrated in (b) and (c) of FIG. 12, may be set in different names. In this instance, when a specific destination is set by the user, the controller 180 may display every set place corresponding to the destination on a screen, and select only home appliance items corresponding to one set place selected by the user.

As described above, in an electronic device according to one embodiment and a method for controlling the same, an operation of at least one home appliance can be controlled on the basis of an estimated time of arrival at a destination without a user's direct control. Also, a control setting of each home appliance may be individually changed in response to a user input. Accordingly, by using the electronic device according to one embodiment and the method for controlling the same, a home appliance selected by the user can automatically be controlled at a precise time that the user desires.

Further, according to one embodiment of the present invention, the aforementioned methods can be implemented as processor-readable codes in a program-recorded medium. The processor-readable medium may include all types of recording devices. Examples of such processor-readable media may include ROM, RAM, CD-ROM, magnetic tape, floppy disk, optical data storage element and the like. Also, the computer-readable medium may also be implemented as a format of carrier wave (e.g., transmission via an Internet).

The configurations and methods of the electronic device in the aforesaid embodiments may not be limitedly applied, but such embodiments may be configured by a selective combination of all or part of the embodiments so as to implement many variations.

Meanwhile, the foregoing description has been given of the example that the electronic device allows the user to set a destination and sets a route to the destination. However, the electronic device can also be replaced with a mobile communications terminal which is provided with a prestored software or embedded navigation module or in which a navigation application received from an external server is installed. Here, the controller 180 of the electronic device 100 according to the embodiments disclosed herein may be a controller of the mobile communications terminal, and the display unit 151 of the electronic device 100 may be a display unit of the mobile communications terminal.

In the foregoing description of this specification, the electronic device 100 has been presented as playing the role of the home network server 460 as well. Thus, when the electronic device 100 is replaced with the mobile communications terminal, the mobile communications terminal can also serve as the home network server 460 through a prestored software or an application received from an external server.

Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

INDUSTRIAL AVAILABILITY

The embodiments disclosed herein propose an electronic device capable of providing route information, and thus be applicable to various related industrial fields.

The invention claimed is:

1. An electronic device capable of providing route information, the electronic device comprising:
a wireless communication unit;
a display unit; and
a controller configured to:
cause the display unit to display a route to a destination;
calculate an estimated time of arrival at the destination along the route;
determine a home appliance of at least one home appliance and a first point along the route at which to transmit a control signal to the home appliance based on the estimated time of arrival;
cause the display unit to display, at the first point on the displayed route, a graphic object corresponding to the home appliance;
determine that the electronic device has passed the first point along the route; and
based on the determination that the electronic device has passed the first point along the route, transmit the control signal that controls the home appliance,
wherein the controller is further configured to:
detect a drag input applied to the graphic object corresponding to the home appliance that is displayed at the first point on the displayed route;
move the graphic object to a second point along the route based on the detection of the drag input applied to the graphic object;
determine that the electronic device has passed the second point along the route; and
based on the determination that the electronic device has passed the second point along the route, transmit the control signal that controls the home appliance.

2. The electronic device of claim 1, wherein the wireless communication unit is configured to utilize near field communication, and
wherein the controller is configured to receive, from an external device through the wireless communication unit, a setting for controlling the at least one home appliance.

3. The electronic device of claim 1, wherein the controller is further configured to:
load control time information related to an operation of the home appliance;
determine, based on the control time information related to the operation of the home appliance and based on the estimated time of arrival at the destination along the route, the first point along the route at which to transmit the control signal to the home appliance.

4. The electronic device of claim 3, wherein the control time information related to the operation of the home appliance is set by the user.

5. The electronic device of claim 4, wherein the control time information comprises at least one of operation start time information or operation end time information related to the home appliance.

6. The electronic device of claim 3, wherein the wireless communication unit is further configured to receive updated traffic information from at least one external server, and
wherein the controller is further configured to determine, based on the received traffic information, the point along the route at which to transmit the control signal.

7. The electronic device of claim 6, wherein the controller is further configured to output, based on the traffic information, screen information on one region of the display unit, the screen information configured to enable the user to select a detour route.

8. The electronic device of claim 7, wherein the controller is further configured to change, based on the control time information and in response to a user selection of the detour route, the point along the route at which to transmit the control signal to the home appliance.

9. The electronic device of claim 1, wherein the controller is further configured to output, adjacent to the graphic object on the display unit, control time information related to the home appliance corresponding to the graphic object.

10. The electronic device of claim 1, wherein the controller is further configured to output, on one region of the display unit, setting information related to the home appliance corresponding to the graphic object.

11. The electronic device of claim 10, wherein the setting information comprises at least one of an operation time or an operation setting of a home appliance corresponding to a graphic object that has a user's touch input applied thereto, and
wherein at least part of the setting information is changed by a user selection.

12. The electronic device of claim 1, wherein the controller is further configured to:
determine that the electronic device is within a predetermined range with respect to the first point; and
display the graphic object on the route based on the determination that the electronic device is within the predetermined range with respect to the first point.

13. The electronic device of claim 1, wherein the controller is further configured to:
determine a type of the home appliance; and
determine, according to the determined type of the home appliance, a type of the graphic object corresponding to the home appliance that is displayed at the first point on the displayed route.

14. A method of controlling an electronic device configured to provide route information, the method comprising:
setting a route to a destination;
displaying the route on a display unit of the electronic device;
calculating an estimated time of arrival at the destination along the route;
determining a home appliance and a first point along the route at which to transmit a control signal to the home appliance based on the estimated time of arrival;
displaying, at the first point along the route, a graphic object corresponding to the home appliance;
determining that the electronic device has passed the first point along the route; and
based on the determination that the electronic device has passed the first point along the route, transmitting the control signal that controls the home appliance,
wherein the method further comprises:
detecting a drag input applied to the graphic object corresponding to the home appliance that is displayed at the first point on the displayed route;
moving the graphic object to a second point along the route based on the detection of the drag input applied to the graphic object;
determining that the electronic device has passed the second point along the route; and
based on the determination that the electronic device has passed the second point along the route, transmitting the control signal that controls the home appliance.

15. The method of claim 14, further comprising:
loading control time information related to an operation of the home appliance;
determining, based on the control time information related to the operation of the home appliance and based on the estimated time of arrival at the destination along the route, the first point along the route at which to transmit the control signal to the home appliance.

16. An automatic control system interoperable with an electronic device configured to provide route information, the system comprising:
an electronic device configured to transmit, based on an estimated time of arrival at a destination, a control signal that remotely controls at least one home appliance;
a home network server configured to remotely control a home appliance of the at least one home appliance based on receiving the control signal; and
at least one home appliance wirelessly connected to the home network server and remotely controlled by the home network server,
wherein the electronic device comprises:
a wireless communication unit;
a display unit; and
a controller configured to:
cause the display unit to display a route to the destination;
calculate the estimated time of arrival at the destination along the route;
determine the home appliance of the at least one home appliance and a first point along the route at which to transmit the control signal to the home appliance based on the estimated time of arrival;
cause the display unit to display, at the first point along the route, a graphic object corresponding to the home appliance;
determine that the electronic device has passed the first point along the route; and
based on the determination that the electronic device has passed the first point along the route, transmit the control signal that controls the home appliance,
wherein the controller is further configured to:
detect a drag input applied to the graphic object corresponding to the home appliance that is displayed at the first point on the displayed route;
move the graphic object to a second point along the route based on the detection of the drag input applied to the graphic object;
determine that the electronic device has passed the second point along the route; and
based on the determination that the electronic device has passed the second point along the route, transmit the control signal that controls the home appliance.

17. The system of claim 16, wherein the electronic device is configured to:
load control time information related to an operation of the home appliance;
determine, based on the control time information related to the operation of the home appliance and based on the estimated time of arrival at the destination, the first point along the route at which to transmit the control signal to the home appliance.

* * * * *